United States Patent
White et al.

(10) Patent No.: US 9,749,717 B2
(45) Date of Patent: Aug. 29, 2017

(54) COLLABORATIVE TELEMETRY

(71) Applicant: Scientific Drilling International, Inc., Houston, TX (US)

(72) Inventors: Matthew White, Templeton, CA (US); Timothy Whitacre, Paso Robles, CA (US); Brian Gleason, Atascadero, CA (US); Mohamed Youssef, Paso Robles, CA (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 0 days.

(21) Appl. No.: 15/011,532

(22) Filed: Jan. 30, 2016

(65) Prior Publication Data

US 2016/0227298 A1   Aug. 4, 2016

Related U.S. Application Data

(60) Provisional application No. 62/110,109, filed on Jan. 30, 2015.

(51) Int. Cl.
- *H04Q 9/00* (2006.01)
- *H04L 7/04* (2006.01)
- *H04L 7/00* (2006.01)

(52) U.S. Cl.
CPC .......... *H04Q 9/00* (2013.01); *H04L 7/0041* (2013.01); *H04L 7/041* (2013.01)

(58) Field of Classification Search
CPC .......... E21B 47/12; E21B 47/00; E21B 47/06; E21B 47/065; G01V 11/002; H04L 7/041; H04L 7/0041; H04Q 9/00
See application file for complete search history.

(56) References Cited

U.S. PATENT DOCUMENTS

| | | |
|---|---|---|
| 4,509,170 A | 4/1985 | Hollinger et al. |
| 4,602,375 A | 7/1986 | Inukai |
| 5,379,224 A | 1/1995 | Brown et al. |
| 5,506,577 A | 4/1996 | Doyle |
| 6,104,978 A | 8/2000 | Harrison et al. |
| 2005/0046592 A1 | 3/2005 | Cooper et al. |

(Continued)

FOREIGN PATENT DOCUMENTS

WO   2014037684 A1   3/2014

OTHER PUBLICATIONS

Sklar, Bernard; "Digital Communications Second Edition"; 2001 (1079 pages); Prentice Hall P T R; Upper Saddle River, New Jersey.

(Continued)

*Primary Examiner* — Ted Wang
(74) *Attorney, Agent, or Firm* — Adolph Locklar

(57) ABSTRACT

A method may include providing one or more telemetry transmission systems, the one or more transmission systems comprising one or more receivers and one or more transmitters. The method may also include transmitting a first synchronization sequence from the one or more telemetry transmission systems, the first synchronization sequence transmitted in a first channel, and the first synchronization sequence being at least a portion of a first telemetry signal. In addition, the method may include transmitting a second synchronization sequence the one or more telemetry transmission systems, the second synchronization sequence transmitted in a second channel, and the second synchronization sequence being at least a portion of a second telemetry signal. The first and second synchronization sequences may be transmitted simultaneously or at a predetermined time difference. The method may include receiving the first synchronization sequence at the one or more receivers, and receiving the second synchronization sequence at the one or more receivers.

44 Claims, 12 Drawing Sheets

(56) References Cited

U.S. PATENT DOCUMENTS

| | | | |
|---|---|---|---|
| 2008/0074948 A1 | 3/2008 | Reckmann | |
| 2009/0251331 A1 | 10/2009 | Wassermann et al. | |
| 2012/0250461 A1 | 10/2012 | Millot et al. | |
| 2013/0154844 A1 | 6/2013 | Montgomery et al. | |
| 2014/0240140 A1 | 8/2014 | Switzer et al. | |
| 2015/0015413 A1 | 1/2015 | Gao | |
| 2015/0109981 A1* | 4/2015 | Patil | H04L 67/1078 370/311 |
| 2016/0105860 A1* | 4/2016 | Li | H04W 4/005 370/350 |

OTHER PUBLICATIONS

Barker, R.H.; (1953). "Group Synchronizing of Binary Digital Sequences"; 1953 (pp. 273-287); Communication Theory. London: Butterworth.

Sachdeva, Nitika and Sharma, Deepak; "Performance Analysis of Conventional Diversity Combining Schemes in Rayleigh Fading Channel" vol. 2, Issue 6; Jun. 2012 (5 pages); International Journal of Advanced Research in Computer Science and Software Engineering.

Cheung, K.-M.; "Eigen Theory for Optimal Signal Combining: A Unified Approach", TDA Progress Report 42-126; Aug. 15, 1996 (9 pages); Communications Systems and Research Section.

Winters, Jack H.; "Optimum Combining in Digital Mobile Radio with Cochannel Interference", vol. SAC-2, No. 4; Jul. 1984 (12 pages); IEEE Journal on Selected Areas in Communications.

Holter, Bengt and Oien, Geir E.; "The Optimal Weights of a Maximum Ratio Combiner Using an Eigenfilter Approach", Oct. 2002 (4 pages); Norwegian University of Science and Technology, Department of Telecommunications.

International Search Report and Written Opinion issued in PCT/US2016/015853, dated May 6, 2016, 13 pages.

* cited by examiner

COLLABORATIVE TELEMETRY

CROSS-REFERENCE TO RELATED APPLICATIONS

The present application claims priority from U.S. Provisional Patent Application No. 62/110,109 filed on Jan. 30, 2015, the entirety of which is incorporated herein by reference.

TECHNICAL FIELD/FIELD OF THE DISCLOSURE

The present disclosure relates generally to wellbore communications and more specifically to transmitting data between a downhole location and the surface.

BACKGROUND OF THE DISCLOSURE

During a drilling operation, data may be transmitted from a downhole transmitter located on a downhole tool included as part of the bottom hole assembly (BHA) of a drill string positioned in a wellbore. The data transmitted from the downhole transmitter may be received by a surface receiver, or by a downhole receiver located elsewhere in the BHA or in an adjacent wellbore. Data transmitted from the downhole transmitter may include, for instance, properties of the surrounding formation, downhole conditions, status of downhole equipment, and the properties of downhole fluids. Electronics present in the BHA may be used for telemetry of data to the surface, collecting data using sensors such as vibration sensors, magnetometers, inclinometers, accelerometers, nuclear particle detectors, electromagnetic detectors, acoustic detectors, acquiring images, measuring fluid flow, determining direction, emitting signals, particles or fields for detection by other devices, interfacing to other downhole equipment, and sampling downhole fluids; The BHA may also include mud motors and steerable drilling systems, such as a rotary steerable system (RSS), which may be used to steer the wellbore as it is drilled. By receiving data from the BHA, an operator may have access to the data collected by the sensors.

The drill string can extend thousands of feet below the surface. Typically, the bottom end of the drill string includes a drill bit for drilling the wellbore. Drilling fluid, such as drilling "mud", may be pumped through the drill string. The drilling fluid typically cools and lubricates the drill bit and may carry cuttings back to the surface. Drilling fluid may also be used for control of bottom hole pressure.

Examples of telemetry techniques for transmitting data to the surface include mud pulse (MP), electromagnetic (EM), hardwired drill pipe, fiber optic cable, and drill collar acoustic.

SUMMARY

The present disclosure provides for a method. The method includes providing one or more telemetry transmission systems, the one or more transmission systems comprising one or more receivers and one or more transmitters. The method also includes transmitting a first synchronization sequence from the one or more telemetry transmission systems, the first synchronization sequence transmitted in a first channel, and the first synchronization sequence being at least a portion of a first telemetry signal. In addition, the method includes transmitting a second synchronization sequence from the one or more telemetry transmission systems, the second synchronization sequence transmitted in a second channel, and the second synchronization sequence being at least a portion of a second telemetry signal. The first and second synchronization sequences are transmitted simultaneously or at a predetermined time difference. The method includes receiving the first synchronization sequence at the one or more receivers, and receiving the second synchronization sequence at the one or more receivers.

The present disclosure also provides for a method. The method includes providing one or more telemetry transmission systems, the one or more transmission systems comprising one or more receivers and one or more transmitters. The method also includes transmitting a first synchronization sequence from the one or more telemetry transmission systems, the first synchronization sequence transmitted in a first channel, and the first synchronization sequence being at least a portion of a first telemetry signal. The method in addition includes repeating the first synchronization sequence in the first channel at a pre-determined interval, and receiving the first synchronization sequence at the one or more receivers.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
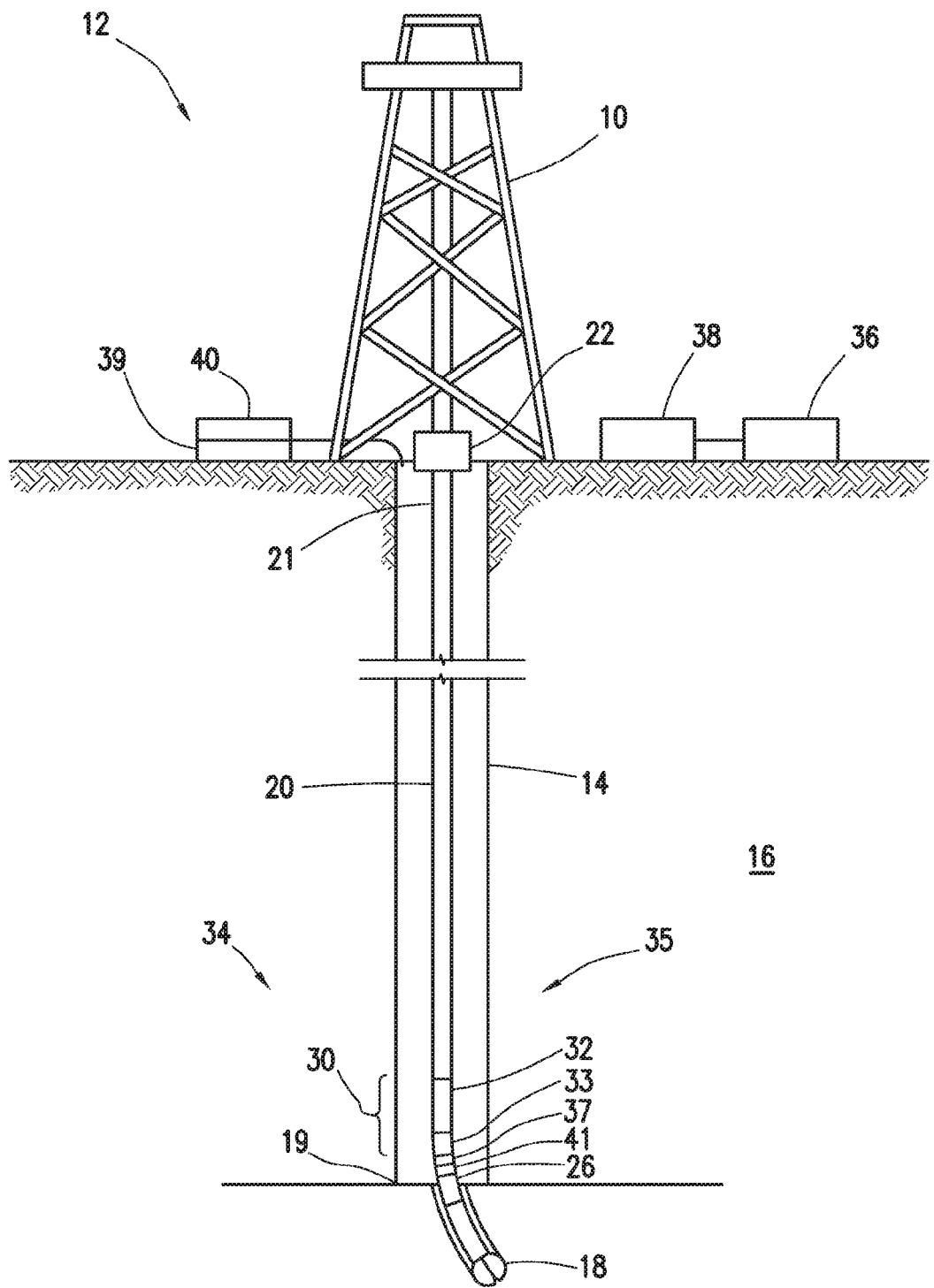
FIG. 1a is a schematic view of a drilling system consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

"Synchronization sequence" means a portion of a telemetry signal used to cause a receiver to adjust to the timing of the transmission of the transmitter, i.e., to cause the receiver to be time-synchronized to the received telemetry signal.

"Data sequence" means a portion of a signal conveying data from a transmitter to a receiver.

"Telemetry signal," as used herein, includes a separate synchronization sequence and data sequence. "Telemetry signal" and "signal" are used synonymously in this disclosure.

"Signal lock," as used herein, means that a receiver is time synchronized to an incoming telemetry signal.

"Uplink," as used herein, refers to transmission from a transmitter located farther downhole than the receiver. The receiver may be located on the surface or within a wellbore.

"Downlink," as used herein, refers to transmission from a transmitter located farther uphole than the receiver. The transmitter may be located at the surface or within the wellbore.

"Physical channel," as used herein, refers to a physical means of transmitting and receiving a telemetry signal. Examples of different physical channels used in this disclosure include, but are not limited to, mud fluid column, electromagnetic through formation/drill-string, acoustic waves through drill-string, or wired-pipe.

"Frequency channel," as used herein, refers to a band-limited frequency range of a physical channel.

"Power spectral density," as used herein, refers to power present in a signal as a function of frequency.

"Telemetry transmission system," as used herein, refers to a system having one transmitter and one receiver and may include other equipment in addition to the one transmitter and one receiver.

FIG. 1a depicts drilling system 12, which includes drilling rig 10. Drilling rig 10 drills wellbore 14 into formation 16. Wellbore 14 is drilled with drill bit 18 positioned at a bottom end 19 of drill string 20. Drill string 20 is supported at upper end 21 by drilling equipment 22. Drill bit 18 may be rotated by a fluid motor, such as mud motor 26. Drilling equipment 22 may pump fluid, such as drilling mud, through drill string 20 to drill bit 18.

Drilling system 12 may include one or more uplink telemetry transmission systems 34. The one or more uplink transmission systems 34 may include one or more uplink transmitters 32 located on BHA 30 for transmitting via either different physical channels, for example and without limitation, mud fluid column, electromagnetic through formation/drill-string, acoustic waves through drill-string, or wired-pipe, or via different frequency channels of the same physical channel to one or more uplink receivers 38. The one or more uplink transmitters 32 may be referred to as a first uplink transmitter, a second uplink transmitter, etc. The one or more uplink receivers 38 may be referred to as a first uplink receiver, a second uplink receiver, etc. In the embodiment shown in FIG. 1a, uplink receiver 38 is a surface receiver. In other embodiments (not shown), uplink receiver 38 may be located within the wellbore being drilled or an adjacent wellbore. In some embodiments, such as the embodiment depicted in FIG. 1a, the one or more uplink transmission systems 34 use a single uplink transmitter 32 and a single uplink receiver 38. In such an embodiment, uplink transmitter 32 transmits through a single physical channel but through different frequency channels, referred to as a first frequency channel, a second frequency channel, etc.

In certain embodiments, one or more uplink transmission systems 34 may further include uplink time synchronizer 33. Uplink time synchronizer 33 may coordinate transmission of uplink telemetry signals for each of the physical or frequency channels with respect to time, referred to as "time coordinated." The telemetry signals in the different physical and/or frequency channels may be transmitted simultaneously or separated by a predetermined time period. In certain embodiments, uplink time synchronizer 33 may be one or more clocks. In some embodiments, uplink time synchronizer 33 is a single clock used for transmission timing on all physical and frequency channels. In other embodiments, one or more clocks may be used for uplink time synchronizer 33, for instance, and without limitation, a separate clock may be used for each channel, where the settings of each clock are identical to the other clocks or differ by a known amount. "Synchronized clocks" refers to two or more clocks that have an identical setting or have settings that differ by a known amount. Where each transmitter uses a separate clock, the clocks may be time coordinated by using a clock synchronization protocol such as Precision Time Protocol (PTP aka IEEE-1588). The separate clocks for the different transmitters may be left uncorrected with respect to one another so that the time of transmission between the transmitters slowly drifts over time, i.e. not synchronized clocks. In this embodiment, the drift between down-hole transmitter clocks may be tracked by estimating the clock drift via a Kalman filter or other optimal state estimation technique.

One or more uplink telemetry transmission systems 34 may further include uplink controller 36 in data connection with one or more uplink receivers 38. Uplink controller 36 may include a receiving system for receiving telemetry signals from all channels. In certain embodiments, the receiving system may receive telemetry signals from all channels simultaneously, i.e, the receiving system is adapted to receive telemetry signals from the one or more uplink receivers 38 regardless of when those telemetry signals are received from one or more uplink receivers 38, including at the same time. When the receiving system is adapted to receive telemetry signals from all channels simultaneously, the receiving system may include synchronized clocks or a single clock.

Uplink controller 36 may further include a channel propagation model. The channel propagation model, as described herein below, may be used to estimate propagation delay for each physical and/or frequency channel. Uplink controller 36 may also include a channel frequency response model. The channel frequency response model, as described herein below, may be used to estimate signal amplitude with respect to frequency for each physical and/or frequency channel. In certain embodiments, the channel propagation model may include the channel frequency response model. The uplink controller 36 may also include a noise and signal estimator. The noise and signal estimator, as described herein below, may, for each physical and frequency channel use a predetermined estimate or determination of telemetry signal sequences and propagation delay to estimate power spectral density (PSD) of total noise, PSD of noise with respect to rig or drilling activity, PSD of noise with respect to rig or drilling activity over time, or a combination thereof. The uplink controller 36 may also include a probability of bit error (Pb) estimator. The probability of bit error estimator, as described herein below, may, use an estimate of signal and noise amplitude to estimate Pb for prospective bit rates, transmission frequencies, signal encoding techniques, forward error correction (FEC) methods, data compression techniques, or combinations thereof. As is known in the art, Pb may be estimated for a given signal encoding method using estimates of the signal and noise amplitudes. For instance, $Pb=Q(sqrt(2*Eb/N0))$ for binary phase shift key (BPSK) where N0 is the noise PSD for additive Gaussian white noise and Q( ) is the Q function for the Gaussian distribution. A discussion of a non-limiting embodiment for determination of Pb may be found in 'Digital Communications', 2nd Ed. by Bernard Sklar, which is incorporated by reference herein in its entirety.

Uplink controller 36 may also include a transmission optimizer. The transmission optimizer may use determined noise PSD, estimated signal to noise ratio (SNR) and estimated Pb to optimize decode reliability, data rate, data resolution, battery life, likelihood of reception and/or delay in reception of high priority alert data, or a combination thereof.

Uplink controller 36 may further include a combined synchronization detector, as described herein below.

Drilling system 12 may further include one or more downlink telemetry transmission systems 35. The one or more downlink transmission systems 35 may include one or more downlink transmitters 39 located on the surface or within the wellbore for transmitting via either different physical channels, for example and without limitation, mud fluid column, electromagnetic through formation/drill-string, acoustic waves through drill-string, or wired-pipe, or via different band-limited frequency channels of the same physical channel to one or more downlink receivers 37. The one or more downlink transmitters 39 may be referred to as a first downlink transmitter, a second downlink transmitter, etc. The one or more downlink receivers 37 may be referred to as a first downlink receiver, a second downlink receiver, etc.

In certain embodiments, one or more downlink transmission systems 35 may further include downlink time synchronizer 40. Downlink time synchronizer 40 may time coordinate transmission of downlink telemetry signals for each of the physical or frequency channels. The downlink telemetry signals in the different physical and/or frequency channels may be transmitted simultaneously or separated by a predetermined time period. In certain embodiments, downlink time synchronizer 40 may be one or more clocks. In some embodiments, downlink time synchronizer 40 is a single clock used for transmission timing on all physical and frequency channels. In other embodiments, one or more clocks may be used for downlink time synchronizer 40, for instance, and without limitation, a separate clock may be used for each channel, where clocks are synchronized clocks. Downlink time synchronizer 40 is shown as separate from uplink controller 36. The clock, however, may be shared between the two and incorporated into uplink controller 36.

When drilling system 12 includes one or more downlink transmission systems 35 and one or more uplink transmission systems 34, simultaneous transmission of uplink or downlink telemetry signals or transmission of uplink or downlink telemetry signals where the time of transmission may differ by a known amount may be used to improve the reliability of telemetry signal uplink reception. For example, to simplify processing of the telemetry signal by uplink controller 36, the difference in propagation delay between the uplink telemetry signals may be adjusted for by delaying transmission of the waveform with the faster propagation speed by the difference in propagation delays estimated from an uplink or downlink telemetry signal so that the uplink telemetry signals are received at the respective one or more uplink receivers 38 time coincident. Further, when drilling system 12 includes one or more downlink transmission systems 35 and one or more uplink transmission systems 34, simultaneous transmission of uplink or downlink telemetry signals or transmission of uplink or downlink telemetry signals where the time of transmission may differ by a known amount may be used to improve the reliability of telemetry signal downlink reception. For example, to simplify processing of the downlink telemetry signal by downlink controller 41, described hereinbelow, the difference in propagation delay between the downlink signals can be adjusted for by delaying transmission of the waveform with the fastest propagation speed by the difference in propagation delays estimated from an uplink or downlink telemetry signal so that the telemetry signals are received at the respective one or more downlink receivers 37 time coincident.

One or more downlink telemetry transmission systems 35 may further include downlink controller 41 in data connection with one or more downlink receivers 37. Downlink controller 41 may include a receiving system for receiving downlink telemetry signals from all channels. In certain embodiments, the receiving system may receive downlink telemetry signals from all channels simultaneously, i.e, the receiving system is adapted to receive downlink telemetry signals from the one or more downlink receivers 37 regardless of when the downlink telemetry signals are received from one or more downlink receivers 37, including at the same time. When the receiving system is adapted to receive telemetry signals from all channels simultaneously, the receiving system may include synchronized clocks or a single clock. The clock of uplink time synchronizer 33 may be used for downlink controller 41. Downlink controller 41 may include a processor. The processor of downlink controller 41 may be the same processor used to control transmission of uplink signals Downlink controller 41 may include a channel propagation model, a channel frequency response model, a noise and signal estimator, a probability of bit error estimator, a transmission optimizer, a combined synchronization detector, or a combination thereof, as described above with respect to uplink controller 36.

Uplink receivers and downlink receivers may be referred to collectively as "receivers", including a first receiver, a second receiver, etc. Receivers may include analog filtering and digital filtering of the received telemetry signal. Uplink transmitters and downlink transmitters may be referred to collectively as "transmitters," including a first transmitter, a second transmitter, etc.

For the embodiment depicted in FIG. 1*a*, downlink telemetry transmission system 35 may include a single downlink receiver 37 to receive downlink telemetry signals from a single downlink transmitter 39. In the embodiment shown in FIG. 1*a*, downlink transmitter 39 is a surface transmitter. In other embodiments, downlink transmitter 39 may be located within the wellbore (not shown). Telemetry signals for downlink telemetry transmission system 35 may be transmitted via different physical channels, including, but not limited to, mud fluid column, electromagnetic through formation/drill-string, acoustic waves through drill-string, or wired-pipe, or via different frequency channels of the same physical channel.

Figure 1B:
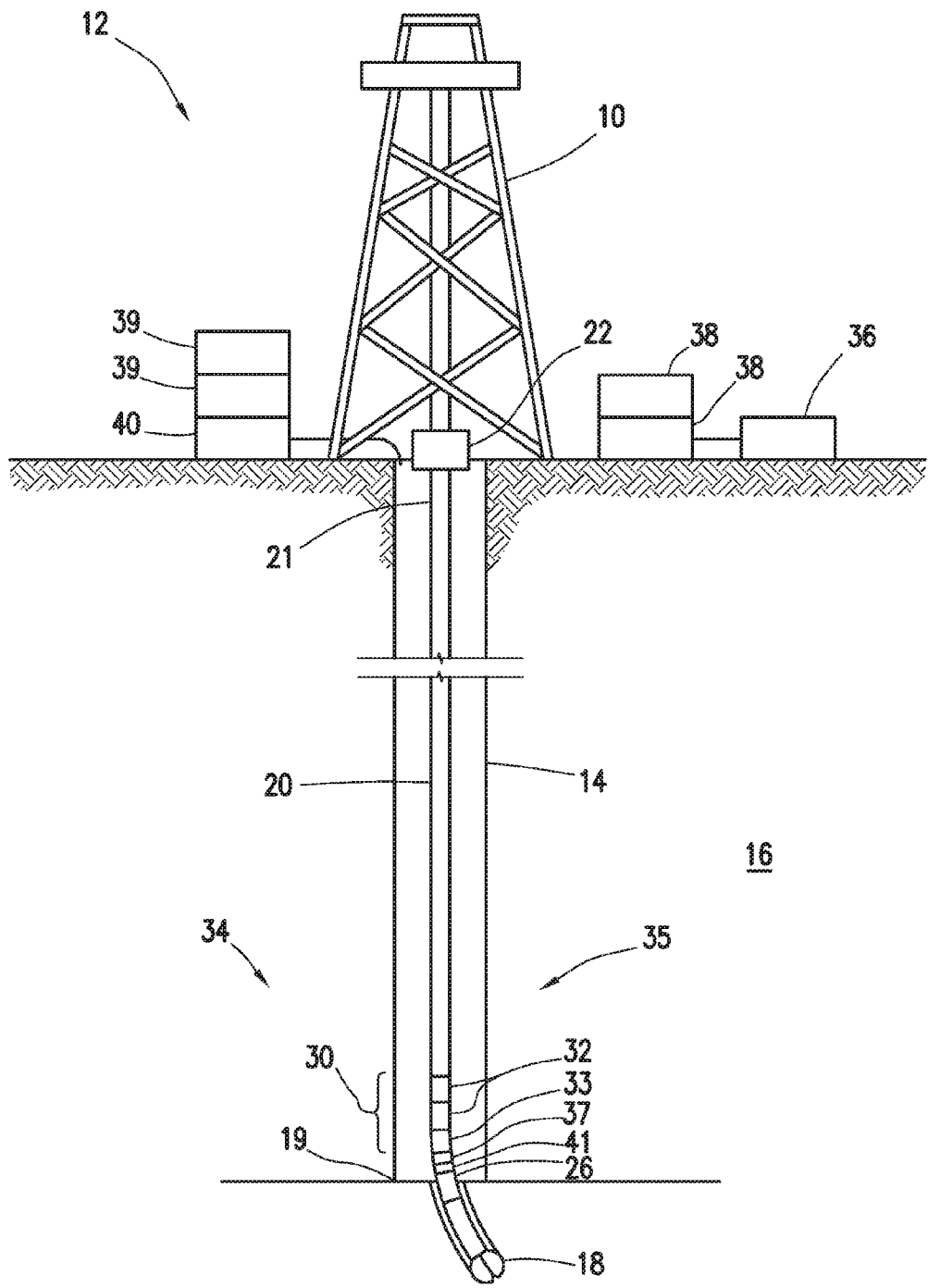
FIG. 1b is a schematic view of a drilling system consistent with embodiments of the present disclosure.

FIG. 1b depicts drilling system 12 wherein uplink receiver 38 is a surface receiver. In other embodiments (not shown), uplink receiver 38 may be located within the wellbore being drilled or in an adjacent wellbore. In some embodiments, such as the embodiment depicted in FIG. 1b, the two or more uplink transmission systems 34 use two uplink transmitters 32 and two uplink receivers 38. In such an embodiment, the uplink transmitters 32 may transmit through a single physical channel but through different frequency channels, or through different physical channels. In other embodiments, the two or more uplink transmission systems 34 may include more than two uplink transmitters 32 and more than two uplink receivers 38.

In the embodiment depicted in FIG. 1b, drilling system 12 may further include two or more downlink telemetry transmission systems 35. Downlink telemetry transmission systems 35 may include two or more downlink receivers 37 to receive commands from two or more downlink transmitters 39. In the embodiment shown in FIG. 1b, downlink transmitters 39 are surface transmitters. In other embodiments, downlink transmitter 39 may be located within the wellbore or an adjacent wellbore. As one of skill in the art with the benefit of this disclosure will appreciate, any number of downlink telemetry transmission systems 35, downlink receivers 37 and downlink transmitters 39 may be included in drilling system 12.

Figure 1C:
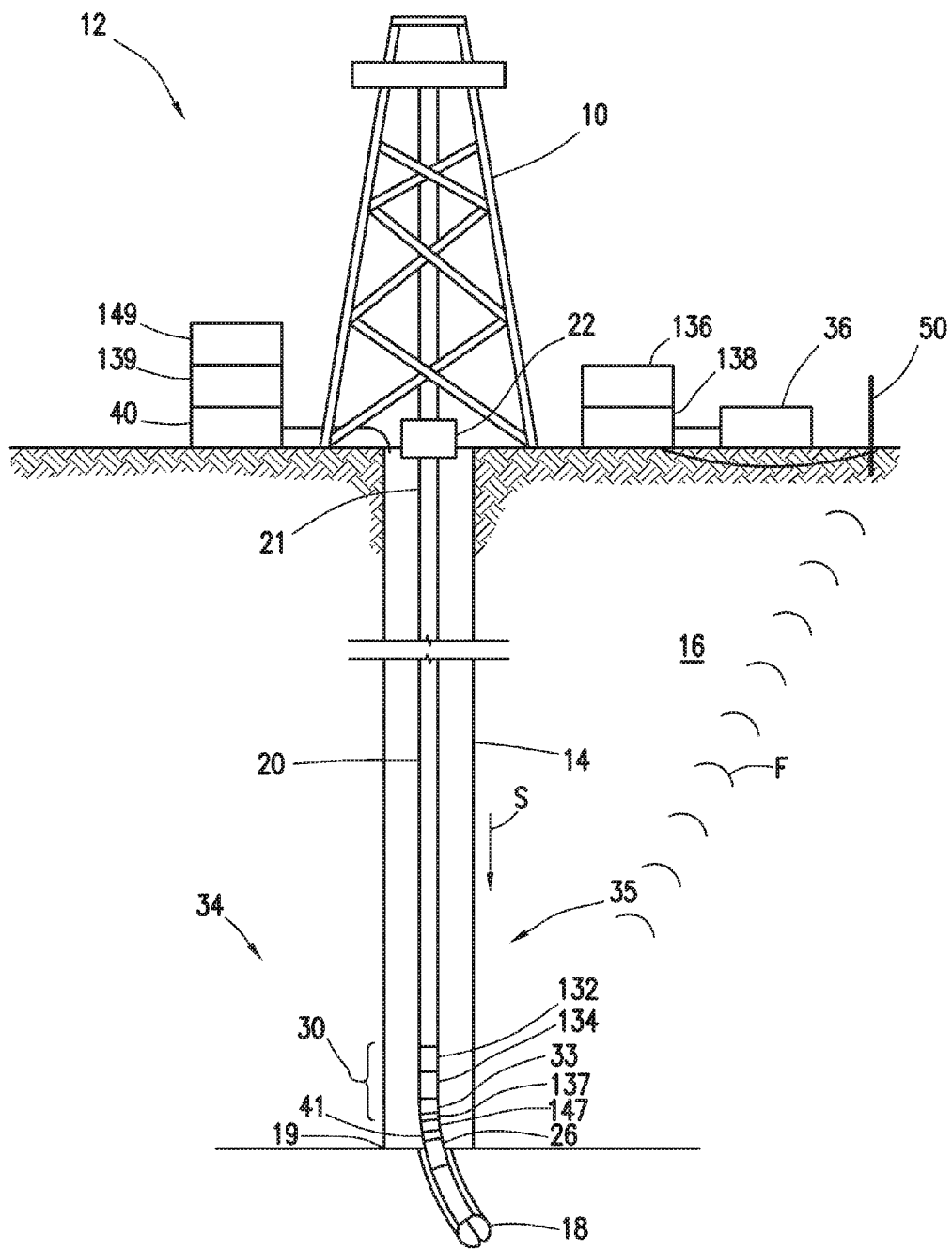
FIG. 1c is a schematic view of a drilling system consistent with embodiments of the present disclosure.

In the embodiment shown in FIG. 1c, drilling system 12 includes MP uplink transmitter 132, used to generate MP uplink telemetry signals. In MP uplink telemetry, MP uplink telemetry signals may be transmitted from MP uplink transmitter 132 when MP transmitter 132 creates pressure waves in drilling mud. The MP uplink telemetry signals may then be received and decoded by MP uplink receiver 138, such as a surface receiver that includes a pressure transducer, as depicted in FIG. 1c (not shown).

In certain embodiments, MP uplink transmitter 132 may generate pressure waves in the drilling mud by modulating a valve and control mechanism, defined herein as a "mud-pulser." The mud-pulser may be mounted in a drill collar positioned above the drill bit. The generated pressure wave travels up the mud column inside the drill string at the velocity of sound in the drilling mud. The velocity of the pressure wave may vary between about 3000 and 5000 feet per second. The actual rate of MP data transmission may be limited due to pulse spreading, distortion, attenuation, modulation rate limitations, and other disruptive forces such as ambient noise in the transmission channel.

In the embodiment shown in FIG. 1c, drilling system 12 includes EM uplink transmitter 134, used to generate EM uplink telemetry signals. In EM uplink telemetry, EM uplink telemetry signals may be generated by creating a potential difference across a region of isolation in drill string 20. The EM uplink telemetry signal may be formed by generating an electromagnetic (EM) field F, which propagates upwardly through formation 16 to the surface and creating and transmitting a return signal S through drill string 20. A conductive member 50, such as an iron stake driven into formation 16, conducts the EM uplink telemetry signal to EM uplink receiver 136.

The embodiment depicted in FIG. 1c further includes MP downlink transmitter 139. MP downlink transmitter 139 may be for instance, a mud pump wherein the flow rate of the mud pump is modulated. In other embodiments, MP downlink transmitter 139 may be a mud-pump in conjunction with a by-pass valve. The embodiment in FIG. 1c also includes EM downlink transmitter 149. EM downlink transmitter 149 may transmit an EM downlink signal by, for example, applying voltage across a ground stake and blow out preventer (BOP) of the well being drilled or across an adjacent wellbore and the BOP of the well being drilled. FIG. 1c further depicts MP downlink receiver 137 and EM downlink receiver 147 for receiving MP downlink signals and EM downlink signals, respectively.

When drilling system 12 includes EM uplink receiver 136, MP uplink receiver 138, MP uplink transmitter 132, EM uplink transmitter 134, MP downlink transmitter 139, EM downlink transmitter 149, MP downlink receiver 137, and EM downlink receiver 147, simultaneous transmission of EM and MP uplink or downlink telemetry signals or transmission of EM and MP downlink telemetry signals where the time of transmission may differ by a known amount, may be used to improve the reliability of telemetry signal uplink reception. For example, to simplify processing of the telemetry signal by uplink controller 36, the difference in propagation delay between the MP and EM uplink telemetry signals may be adjusted for by delaying transmission of the EM waveform by the difference in propagation delays estimated from an uplink or downlink telemetry signal (described below) so that the EM and MP uplink telemetry signals are received at the respective EM receiver 136 and MP receiver 138 time coincident. Further, when drilling system 12 includes EM uplink receiver 136, MP uplink receiver 138, MP uplink transmitter 132, EM uplink transmitter 134, MP downlink transmitter 139, EM downlink transmitter 149, MP downlink receiver 137, and EM downlink receiver 147, simultaneous transmission of EM and MP uplink or downlink telemetry signals or transmission of EM and MP uplink or downlink telemetry signals where the time of transmission may differ by a known amount may be used to improve the reliability of telemetry signal downlink reception. For example, to simplify processing of the downlink telemetry signal by downhole command processor 240, the difference in propagation delay between MP and EM uplink telemetry signals may be adjusted for by delaying transmission of the EM waveform by the difference in propagation delays estimated from an uplink or downlink telemetry signal (described below) so that the EM and MP telemetry signals are received at the MP downlink receiver 137 and EM downlink receiver 147 time coincident.

Figure 2A:
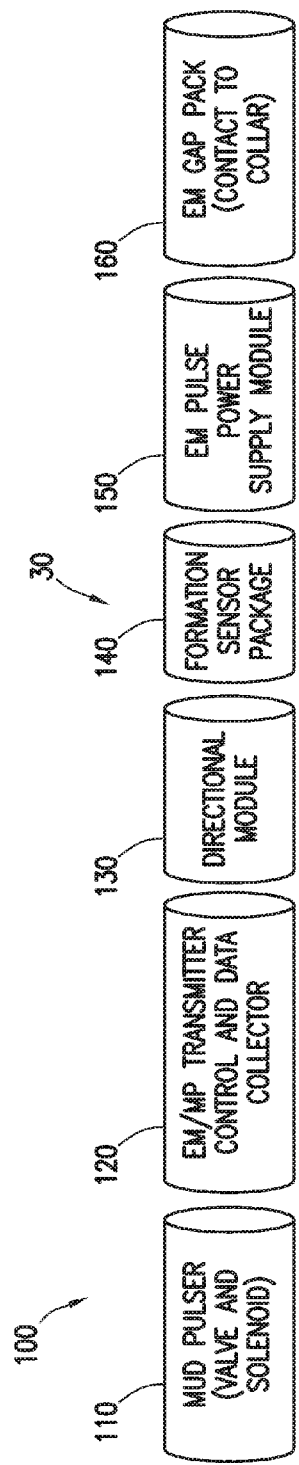
FIG. 2A is schematic view of a telemetry sub consistent with embodiments of the present disclosure.

FIG. 2A depicts a non-limiting embodiment of telemetry sub 100 of BHA 30. Telemetry sub 100 includes mud-pulser 110. In the embodiment shown in FIG. 2A, mud-pulser 110 includes a mud-pulser valve, used to generate the mud pulse, and a solenoid, used to actuate the mud-pulser valve. Telemetry sub 100 further includes EM/MP Transmitter Control and Data Collector 120. EM/MP Transmitter Control and Data Collector 120 may include electronics for a) energizing the mud-pulser solenoid; b) determining and controlling when EM telemetry and MP telemetry is sent from telemetry sub 100; c) collecting data from sensors located on BHA 30. In certain embodiments, EM/MP Transmitter Control and Data Collector 120 also includes one or more clocks for timing telemetry transmission. In some embodiments, EM/MP Transmitter Control and Data Collector 120 includes a common clock used for both EM and MP telemetry. Use of a common clock may eliminate differences in timing between separate clocks for EM and MP telemetry. In certain embodiments, telemetry sub 100 may also include EM pulse power supply module 150. EM pulse power supply module may be used to power the EM telemetry signal. Telemetry sub 100 may also include EM gap pack 160 to provide an electrically isolated gap to generate the EM telemetry signal across. Telemetry sub 100 may also include power supplies, batteries, motors, and or generators for providing power for the sub components of telemetry sub 100 (not shown)

In some embodiments, telemetry sub 100 may include directional module 130. Directional module 130 may, for instance, include magnetometers and accelerometers for determining the direction to magnetic north and inclination from vertical. In other embodiments, directional module 130 may be omitted. In certain embodiments, formation sensor package 140 may be included in telemetry sub 100. Formation sensor package 140 may include one or more sensors. Sensors may include sensors for determining direction & orientation of BHA 30, including magnetometers, accelerometers, and/or gyroscopes, or formation sensors for determining information about the formation, including resistivity, porosity, density, pressure, weight-on-bit, torque-on-bit, and/or vibration level. In the embodiment shown in FIG. 2A, formation sensor package 140 may be, for instance and without limitation, a gamma module.

The subcomponents of telemetry sub 100 may be in electrical connection, i.e., each of, for instance, mud-pulser 110, EM/MP Transmitter Control and Data Collector 120, EM pulse power supply module 150, EM gap pack 160, directional module 130, and formation sensor package 140 may be in electrical connection.

In certain embodiments, telemetry sub 100 may be incorporated into a rotary steerable system or used with a conventional mud-motor and bent sub.

Figure 2B:
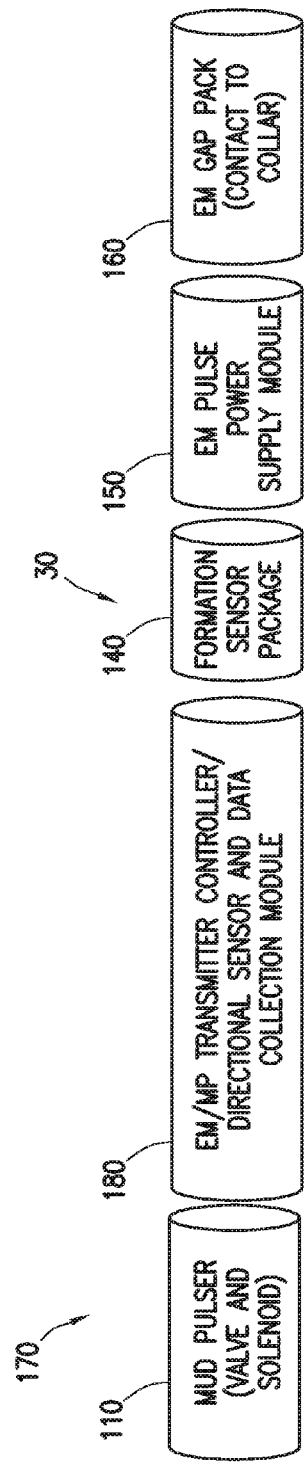
FIG. 2B is a schematic view of a telemetry sub consistent with embodiments of the present disclosure.

FIG. 2B depicts an alternative embodiment of a telemetry sub, telemetry sub 170. Telemetry sub 170 may include mud-pulser 110, EM/MP Transmitter Control/Directional, Sensor, & Data Collector 180, EM pulse power supply module 150, EM gap pack 160, and formation sensor package 140 may be in electrical connection. EM/MP Transmitter Control/Directional, Sensor, & Data Collector 180 may include electronics for a) energizing the mud-pulser solenoid; b) determining and controlling when EM telemetry and MP telemetry is sent from telemetry sub 100; c) magnetometers and accelerometers for determining the direction to magnetic north and inclination from vertical; and d) collecting data from sensors located on BHA 30.

The subcomponents of telemetry sub 110 and telemetry sub 170 may be modular, or integrated. For the purposes of this disclosure, "modular" means that the subcomponents are separable and may be interchangeable with others. "Integrated" means that the subcomponents are not easily separable, and may be welded together or otherwise formed into a single component.

Figure 3:
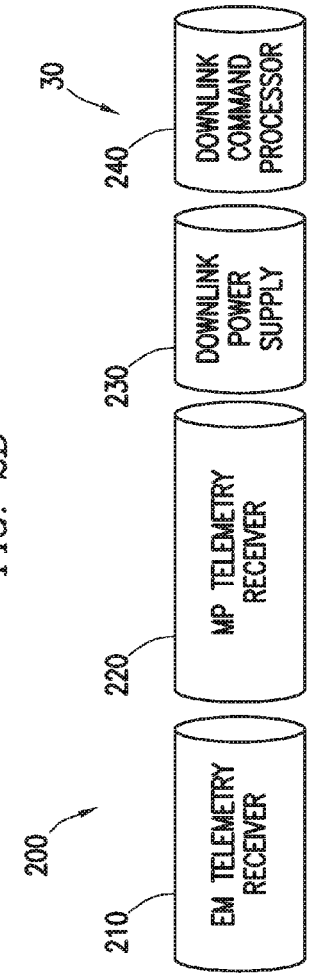
FIG. 3 is a schematic view of a downlink assembly consistent with embodiments of the present disclosure.

In certain embodiments, BHA 30 may also include one or more receivers for the receipt of downlink telemetry signals, for example and without limitation, an EM telemetry receiver, MP telemetry receiver, or both an EM telemetry receiver and a MP telemetry receiver. Downlink telemetry signals may include data, including data for commands for subcomponents of the BHA. As shown in FIG. 3, downlink assembly 200 may include EM telemetry receiver 210, MP telemetry receiver 220, downlink power supply 230, and downlink command processor 240. Downlink power supply 230 may include a battery, and may be used to supply power to downlink command processor 240, EM telemetry receiver 210, and MP telemetry receiver 220.

When downlink assembly 200 includes both EM telemetry receiver 210 and MP telemetry receiver 220, simultaneous transmission of EM and MP uplink or downlink telemetry signals or transmission of EM and MP uplink or downlink telemetry signals where the time of transmission may differ by a known amount, may be used to improve the reliability of telemetry signal reception. For example, to simplify processing of the downlink telemetry signal by downhole command processor 240, the difference in propagation delay between the MP and EM downlink signals can be adjusted for by delaying transmission of the EM waveform by the difference in propagation delays estimated from an uplink or downlink telemetry signal (described below) so that the EM and MP telemetry signals are received at the respective EM and MP receivers time coincident. Downhole command processor 240 may be the same as downlink controller 41. The subcomponents of downlink assembly 200 may be modular, or integrated. Although not shown, downlink assembly 200 may be incorporated into EM/MP Transmitter controller and data collector 120 or EM/MP Transmitter controller/directional sensor and data collection module 180.

The embodiments discussed herein below include the use of two or more physical and/or frequency channels. By transmitting synchronization sequences from two or more transmitters that use separate frequency and/or physical channels, a receiver may more easily obtain and maintain signal lock for all channels. For instance, transmitters for different channels may transmit a synchronization sequence at the same time, or at different times separated by a known time interval. A controller may calculate an estimated time separation for receipt of synchronization sequences from different channels based on a combination of any time interval between transmissions, if any, and the estimated time delay due to differences in propagation speed between transmitter and receiver in different channels.

A "channel propagation model" may be used to estimate propagation delay for a physical and/or frequency channel. The time required for a telemetry signal to travel from transmitter to receiver in one physical channel compared to another will differ due to the physical laws associated with that channel. Similarly, the time required for a telemetry signal to travel from transmitter to receiver at one frequency channel compared to another frequency channel may differ for dispersive channels for which the propagation speed is dependent on signal frequency. For example, transmission of a synchronization sequence of an MP telemetry signal through a mud column travels more slowly than a synchronization sequence of an EM telemetry signal through a formation. Because of differences in propagation speeds between different channels, a receiver may calculate the estimated time delay between signals from each of the frequency and physical channels based on a channel propagation model. A channel propagation model determines the time delay between transmission of a particular telemetry signal by a transmitter and receipt of the telemetry signal by the receiver.

In one embodiment of a channel propagation model, calculation of a time delay estimate, which may be used as the estimated time delay, may be accomplished by a time delay tracking model. The time delay estimate may be determined by measuring the difference in receipt time at the receiver of synchronization and/or data sequences at a location where signals from each of the channels are received by the receiver with a sufficiently large signal-to-noise ratio to allow the receiver to detect and determine the estimated start time of each signal. The "estimated start time" is the time at which the synchronization sequence is received by the receiver. In some embodiments of the time delay tracking model, the estimated start time of the first synchronization sequence and the estimated start time of a second synchronization sequence are determined. A first measured time delay between the first synchronization sequence and the second synchronization sequence is determined as the difference between the estimated start time of the first synchronization sequence and the second synchronization sequence. As the transmitters on the BHA descend into or ascend out of the borehole, a receiver may use a previously determined time delay to search for the synchronization sequence. Once signal locked to the channel's synchronization sequence, the receiver can then update the time delay estimate to obtain an updated time delay estimate. The time delay estimate may be updated by, for instance and without limitation, blending the most recent time delay estimate with a previous time delay estimate or combination of previous time delay estimates. As a non-limiting example, this could be accomplished with a finite impulse (FIR) or infinite impulse response (IIR) filter operating on the most recent time delay estimate and past time delay estimates. In another, non-limiting embodiment, weights for blending the present and past time delay estimates may be made proportional to the correlation coefficient calculated for respective received synchronization or data sequences.

In another channel propagation model, a receiver may use the speed of propagation of the signal (c) as determined by a physical propagation model along with distance from the receiver to the transmitter, as determined by, for example, a depth measurement apparatus, to calculate a predicted time delay, which may be used as an estimated time delay. Examples of physical propagation models include the speed of sound in liquid given the density, temperature and viscosity and the speed of light in the formation given permittivity and permeability. A non-limiting example of a physical propagation model is the use of Hook's Law as a physical propagation model for the speed of sound in a fluid. Hook's Law states that $c=\sqrt{E/ro}$, where c is the speed of sound, E is the bulk modulus elasticity and ro is density. The predicted time delay may be calculated as the along hole distance, d, as measured by the depth measurement device divided by c, the speed of the signal. To update the predicted time delay as the tool descends the wellbore, along-hole depth may be read from the drawworks encoder or obtained from the drilling system, mud density and bulk modulus elasticity is obtained from the mud logger or the drilling system. The predicted time delay may then be updated. Other embodiments may adjust the propagations speed based on the pressure gradient variance with vertical depth or temperature variation effects on the density of the fluid. The physical propagation model calculates a predicted time delay, which may be used as the estimated time delay.

In certain embodiments, a blended time delay model may use a Kalman filter or other optimal state estimation technique to combine both the time delay estimate calculated from the time delay tracking model and the predicted time delay from the physical propagation model to obtain the estimated time delay. Thus, in certain embodiments, as the propagation speed of an MP telemetry signal through a mud column and the propagation speed of an EM telemetry signal through a formation may be calculated, the time delay may be estimated.

In certain embodiments, an estimate of clock drift between the clocks of a transmission and receiving system may be made. Clock drift may be caused by inaccuracy in the frequencies of the clocks of the transmission and receiving systems with respect to one another. An estimate of clock drift may be made by a controller, for instance, uplink controller 36 or downlink controller 41, by estimating the time delay between receipt of sections of the received signal on a single physical or frequency channel separated by a known transmission time difference, subtracting the estimated time delay from the known transmission time difference, and dividing by the known transmission time difference. Sections of the received signal used to estimate the time delay may include synchronization sequences, portions of the data sequences or combinations thereof. In some embodiments, an estimate of clock drift between the clocks of a transmission and receiving system may be added to the estimated time delay of the time delay estimate model, physical propagation model or blended time delay model to obtain an adjusted time delay.

Figure 5:
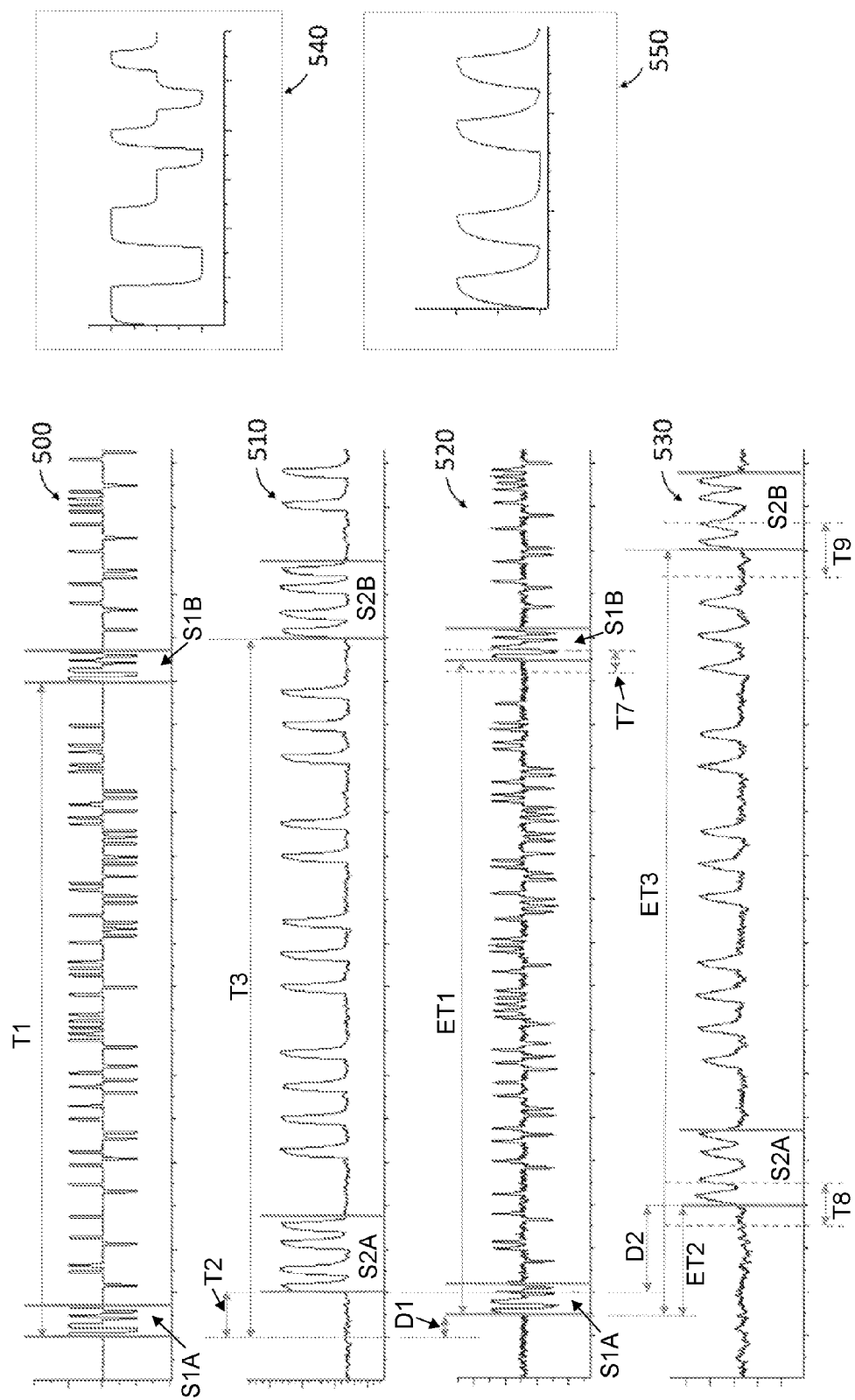
FIG. 5 is a graphical depiction of transmission and receipt of telemetry signals consistent with at least one embodiment of the present disclosure.

FIG. 5 is a graphical depiction of an example of transmission and receipt of telemetry signals consistent with at least one embodiment of the present disclosure. FIG. 5 includes signal 1 transmission graph 500. Signal 1 transmission graph 500 is a graphical representation of the transmission of a first telemetry signal at transmitter 1, the transmitter associated with signal 1. Signal 1 transmission graph 500 plots the amplitude of the first telemetry signal versus time. As shown in signal 1 transmission graph 500, S1A and S1B are two representative synchronization sequences for transmitter 1. T1 is the known transmission time difference between transmission of S1A and S1B by transmitter 1. Signal 1 transmission graph 500 may represent the transmission of an EM signal.

Also shown in FIG. 5 is signal 2 transmission graph 510. Signal 2 transmission graph 510 is a graphical representation of the transmission of a second telemetry signal at transmitter 2, the transmitter associated with signal 2. Signal 2 transmission graph 510 plots the amplitude of the second telemetry signal versus time. As shown in signal 2 transmission graph 510, S2A and S2B are two representative synchronization sequences for transmitter 2. T2 is the known transmission time difference between S1A and S2A. T3 is the known transmission time difference between S1A and S2B. Signal 2 transmission graph 510 may represent the transmission of a MP signal.

In addition, FIG. 5 includes signal 1 receipt graph 520. Signal 1 receipt graph 520 is a graphical representation of the receipt of the first telemetry signal at receiver 1, the receiver associated with signal 1. Signal 1 transmission graph 520 plots the amplitude of the first telemetry signal versus time as received by receiver 1. As shown in signal 1 receipt graph 520, S1A and S1B are two representative synchronization sequences as received by receiver 1. D1 is the propagation delay for the channel of transmitter 1. ET1 is the estimated time delay between receipt of synchronization sequences S1A and S1B. T7 is the time about which a controller, for instance, uplink controller 36 or downlink controller 41 will search the first telemetry signal for S1B with respect to S1A due to clock drift between the clocks of the transmitting and receiving systems. An exemplary calculation for an estimate of the clock drift between the transmission and receiving systems of FIG. 5 using T1 and ET1 is (ET1−T1)/T1.

FIG. 5 also includes signal 2 receipt graph 530. Signal 2 receipt graph 530 is a graphical representation of the receipt of the second telemetry signal at receiver 2, the receiver associated with signal 2. Signal 2 transmission graph 530 plots the amplitude of the second telemetry signal versus time as received by receiver 2. As shown in signal 2 receipt graph 530, S2A and S2B are two representative synchronization sequences as received by receiver 2. D2 is the propagation delay for the channel of transmitter 2. ET2 is the estimated time delay between receipt of synchronization sequences S2A and S2B. ET3 is the estimated transmission time difference between S1A and S2B. T8 is the time about which receiver 1 will search the first telemetry signal for S2A with respect to S1A due to error in the estimation of ET2. For the time delay tracking model, the error in estimation of ET2 may be due to transmitting/receiving systemclock drift estimation error and time delay tracking error. For the physical propagation model, the error in estimation of ET2 may be due to propagation model errors and transmitting/receiving system clock drift estimation error. For the blended time delay model, the error in estimation of ET2 may be due to all of the aforementioned errors. T9 is the time about which the receiver will search for S2B with respect to S1A due to error in estimation of ET2 and transmitting/receiving system clock drift estimation error.

FIG. 5 also includes synchronization signal 1 reference graph 540 and synchronization signal 2 reference signal graph 550, representing the reference signals for each of telemetry signals 1 and 2, respectively.

Combined synchronization detector—When a receiver has not obtained signal lock for any channel, the estimated time delay between synchronization sequences for two or more frequency and/or physical channels may be used to perform a combined synchronization operation to detect a combined synchronization sequence. Without being bound by theory, a combined synchronization sequence has greater signal energy than the synchronization sequence for any one channel.

Further, without being bound by theory, noise sources across different frequency and physical channels will often be uncorrelated or partially uncorrelated, so that the probability of receiving at least one of the synchronization sequences with sufficient signal to noise ratio (SNR) to allow reliable detection of the synchronization sequence is increased in the combined synchronization sequence as compared to a single synchronization sequence.

Multiple methods can be employed to detect and accurately time synchronize at least one receiver to a combined synchronization sequence. Non-limiting methods to detect and accurately synchronize to a combined synchronization sequence are delineated hereinafter.

Correlation Properties of Combined Synchronization Sequences—A combined synchronization sequence may be constructed such that the auto-correlation peak may be more defined than a synchronization sequence from a single channel, i.e., the longer the sequence, the more defined the auto-correlation peak can be made. Since the concatenation of two or more sequences is longer than a single sequence, a more defined auto-correlation peak may be made by correlating against the combination of the two sequences. Furthermore, the increased length of the concatenation of two or more sequences may result in a reduction in amplitude of the auto-correlation side-lobes which reduces the likelihood of incorrect time alignment of the receiver to the incoming signal. Methods for constructing sequences with low auto-correlation side lobes known in the art, such as Barker, R. H. (1953). "*Group Synchronizing of Binary Digital Sequences*". Communication Theory. London: Butterworth. pp. 273-287, may be used to construct combined synchronization sequences which reduce the amplitude of the side lobes.

Figure 4:
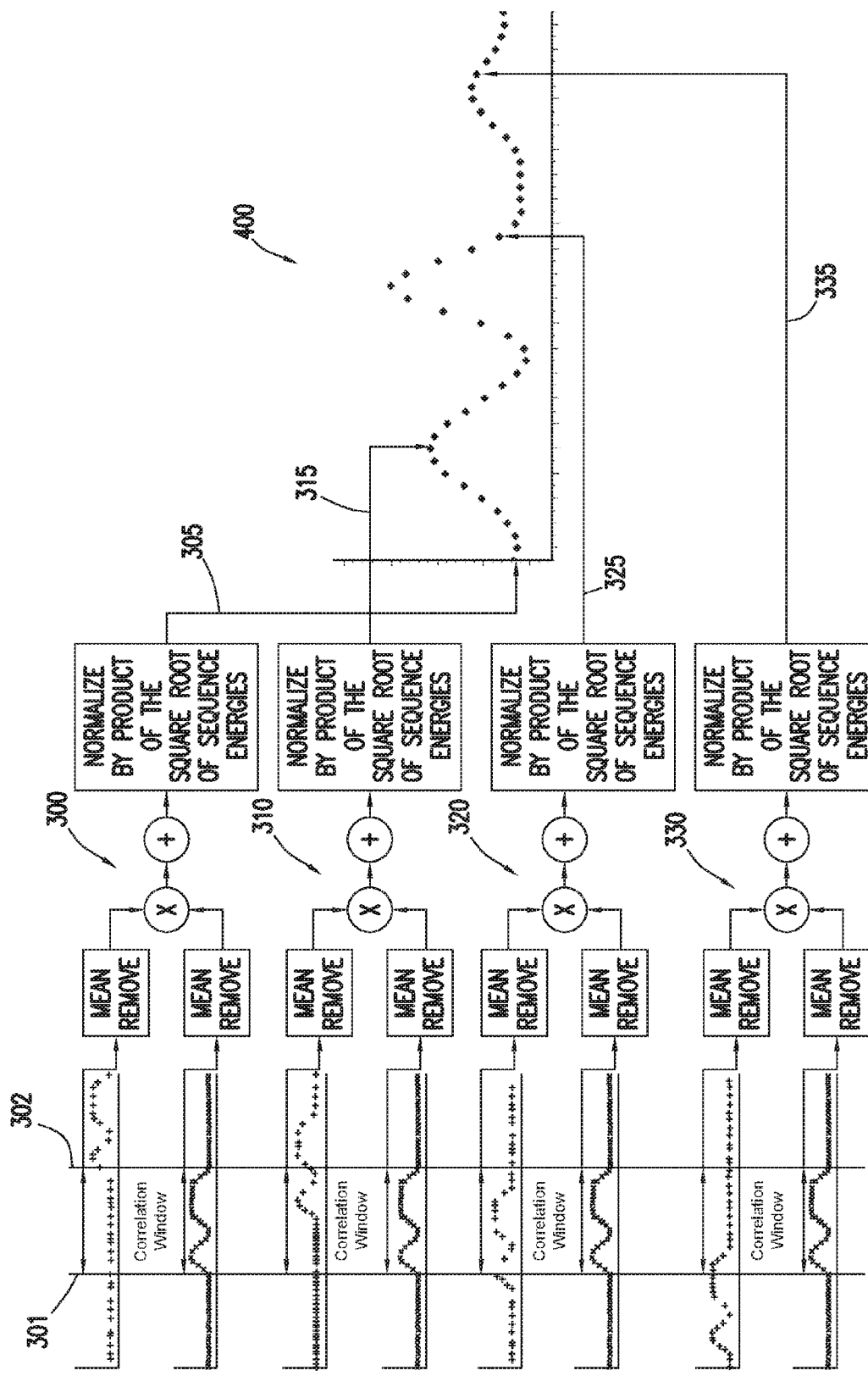
FIG. 4 is a graphical depiction of the generation of an autocorrelation.

One non-limiting example of a correlator is depicted in FIG. 4. In the method of FIG. 4, incoming synchronization sequence/reference synchronization signal pairs 300, 310, 320 and 330 are shown. The resulting autocorrelation plot 400 (labeled "Auto-Correlation of Sync Sequence in FIG. 4) is also shown. Vertical bars 301, 302 represent the corresponding time index span (identified as "correlation window") on FIG. 4, and delineate the samples over which the correlation coefficient calculation will be performed. For each of incoming synchronization sequence/reference synchronization signal pairs 300, 310, 320 and 330, the sequence mean of both the incoming synchronization sequence and the reference synchronization sequence is removed. Each point of the incoming synchronization sequence and reference synchronization sequence within the correlation window is multiplied point by point, the results of which are summed, and the sum normalized by the product of the square root of the energies of the incoming synchronization sequence and the reference synchronization sequence calculated over the correlation window. The resulting point is reflected in autocorrelation plot 400 as shown by arrows 305, 315, 325, and 335. Because in this example, the incoming and reference synchronization signals are identical, the resultant output is called the "autocorrelation". As will be recognized by one of skill in the art with the benefit of this disclosure, the operation described in FIG. 4 is also known as the "correlation coefficient" but is sometimes commonly referred to as the "correlation function" or simply "correlation".

Each of incoming synchronization sequence/reference signal pairs 300, 310, 320 and 330 represent a calculation of correlation coefficients at exemplary indexes in time for each point of overlap between the incoming synchronization sequence and the reference synchronization sequence. The incoming synchronization sequence in the incoming synchronization sequence/reference synchronization signal pair 300 is shown with a single point of overlap with the reference synchronization sequence of incoming synchronization sequence/reference synchronization signal pair 300, which corresponds to the first point in auto-correlation plot 400, as indicated by arrow 305. Subsequent synchronization sequence/reference synchronization signal pairs 310, 320, and 330 depict the incoming synchronization sequence shifted, resulting in the point indicated in auto-correlation plot 400 by arrows 315, 325, and 335, respectively. The plots show only a few shifts of the incoming synch sequence with respect to the reference sequence. In certain embodiments, the incoming synchronization sequence is shifted one sample index between calculations of the correlation coefficient. To save computation time, however, in other embodiments, the incoming synchronization sequence may be shifted by more than one sample index between correlation coefficient calculations.

The correlation operation described above in reference to FIG. 4 may be used to calculate a correlation on combined synch sequence generated by concatenating two or more synchronization sequences. Telemetry signals received from different physical and/or frequency channels, however, may have differing amplitudes and means which may result in a reduction in the correlator output and may also result in limiting the ability of the correlator to detect and time synchronize to synchronization sequences. To compensate for these differences a combined correlator, as described below, may be used.

A combined correlator may be mathematically described as follows and results in calculation of a combined correlation coefficient $\rho_c$, at time index k for n reference waveforms, $r_i$, with corresponding signals, $s_i$, both of length $m_i$, with means $\bar{r}_i$ and $\bar{s}_i$ respectively and signal time offsets, $o_i$:

$$\rho_c(k) = \frac{\sum_{i=1}^{n} \sum_{j=1}^{m_i} (r_i(j) - \overline{r_i})(s_i(k + o_i + j) - \overline{s_i})}{\sqrt{\left[\sum_{i=1}^{n} \sum_{j=1}^{m_i} (r_i(j) - \overline{r_i})^2\right]\left[\sum_{i=1}^{n} \sum_{j=1}^{m_i} (s_i(k + o_i + j) - \overline{s_i})^2\right]}}$$

Signals $s_i$ may include signals from any of the physical or frequency channels. Furthermore, signals $s_i$ may include signals from the same channel at different time offsets. Reference waveforms, $r_i$, may include reference waveforms for any of the of the physical or frequency channels corresponding to the signals, $s_i$. Signal time offsets, $o_i$, may include any of the estimated time delays. Furthermore, time offsets, $o_i$, may be varied to account for error in estimated time delay as previously indicated.

Figure 6:
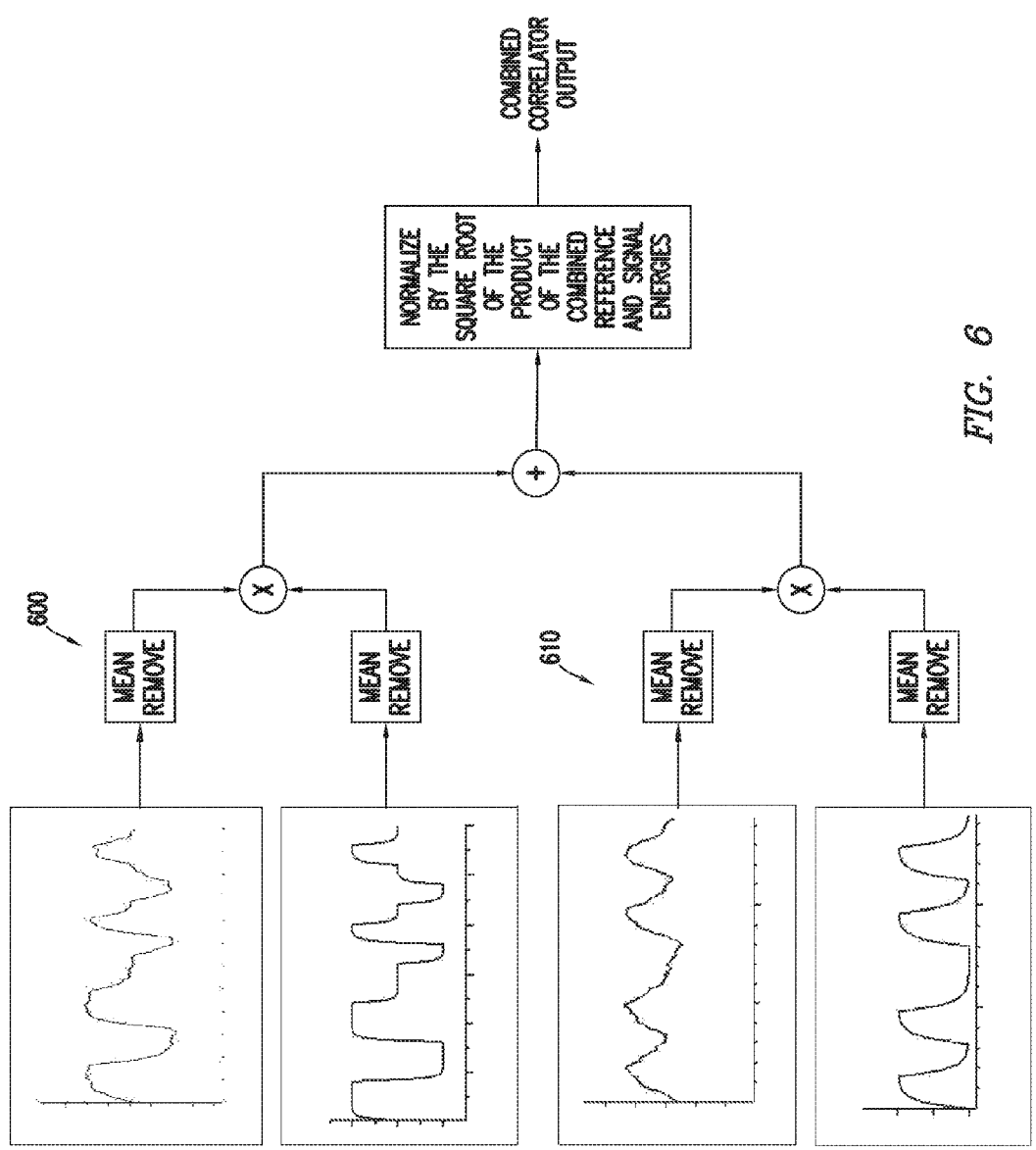
FIG. 6 is a graphical depiction of a combined correlation operation consistent with embodiments of the present disclosure.

FIG. 6 is a graphical depiction of a combined correlation operation performed by a combined correlator. As in FIG. 4, for each of incoming synchronization sequence/reference synchronization signal pairs 600 (for signal 1) and 610 (for signal 2), the sequence mean of both the incoming synchronization sequence and the reference synchronization sequence is removed. Each point of the incoming synchronization sequence and reference synchronization sequence is multiplied point by point. The resultant output of the point by point multiplication of the two signal pairs is summed to form a summed output, and then normalized by the square root of the product of the combined reference and signal energies to result in a combined correlator output.

Figure 7:
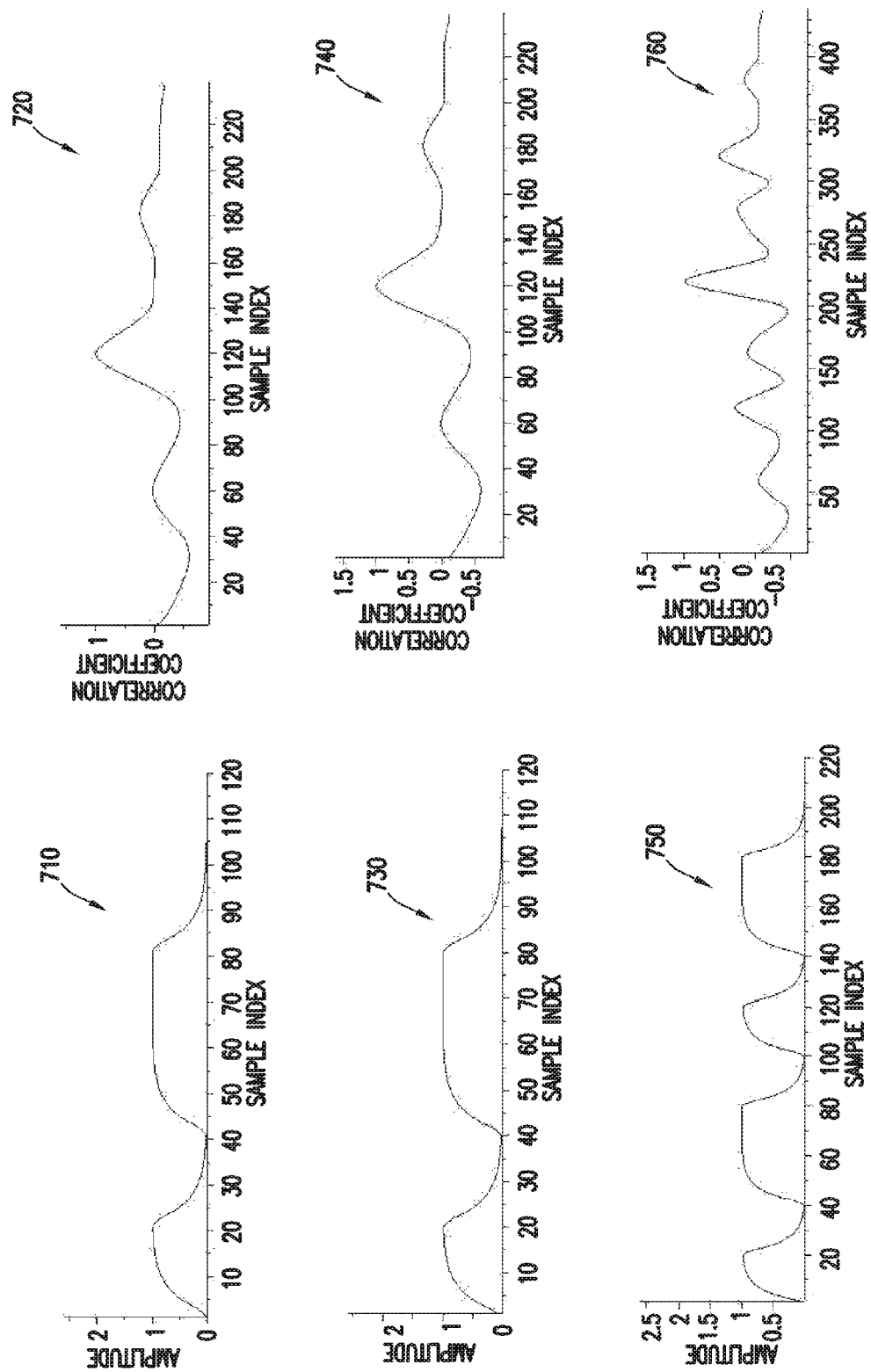
FIG. 7 is a graphical representation of the effect of combining an exemplary pair of signals on the autocorrelation consistent with embodiments of the present disclosure.
Figure 8:
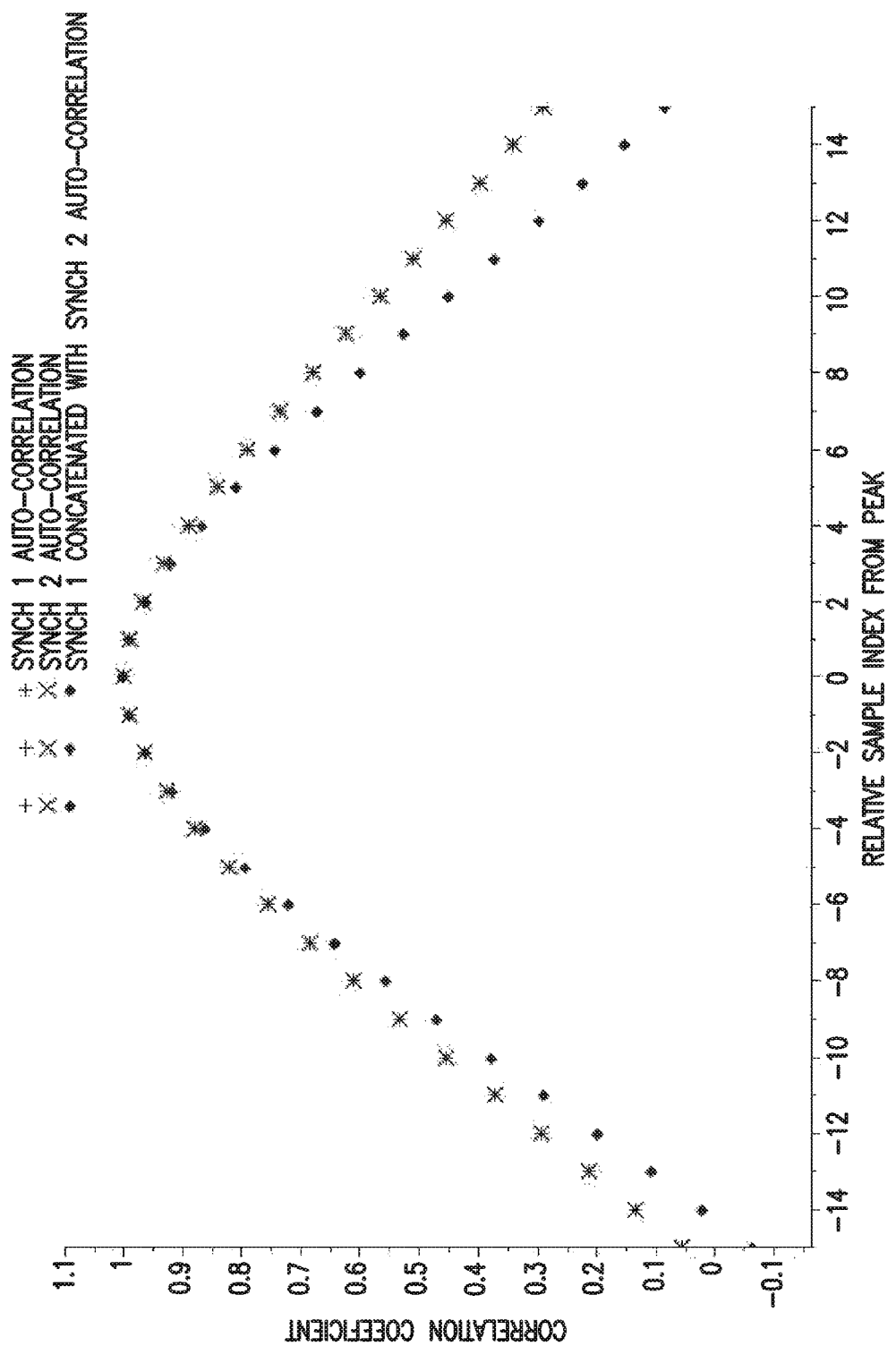
FIG. 8 is an expanded plot of autocorrelation graphs from FIG. 7 consistent with embodiments of the present disclosure.

FIG. 7 is a graphical representation of the autocorrelation of signals 1 and 2, as described above with reference to FIG. 4 compared to the effects of a combined correlation operation, as described above with respect to FIG. 6. FIG. 7 depicts synchronization signal 1 in synch 1 graph 710 and the resulting auto-correlation of signal 1 in auto-correlation of synch 1 graph 720. FIG. 7 further depicts signal 2 in synch 2 graph 730 and the resulting auto-correlation of signal 2 in auto-correlation of synch 2 graph 740. The concatenation of signal 1 with signal 2 is shown in synch 1/synch 2 graph 750. The auto-correlation of signal 1 concatenated with signal 2 is shown in auto-correlation synch 1/synch 2 graph 760, which is the result of a combined synchronization autocorrelation operation as described above with respect to FIG. 6. FIG. 8 is an expanded plot of overlain graphs 720, 740, and 760 from FIG. 6 for auto-correlation main lobe peak.

Figure 9:
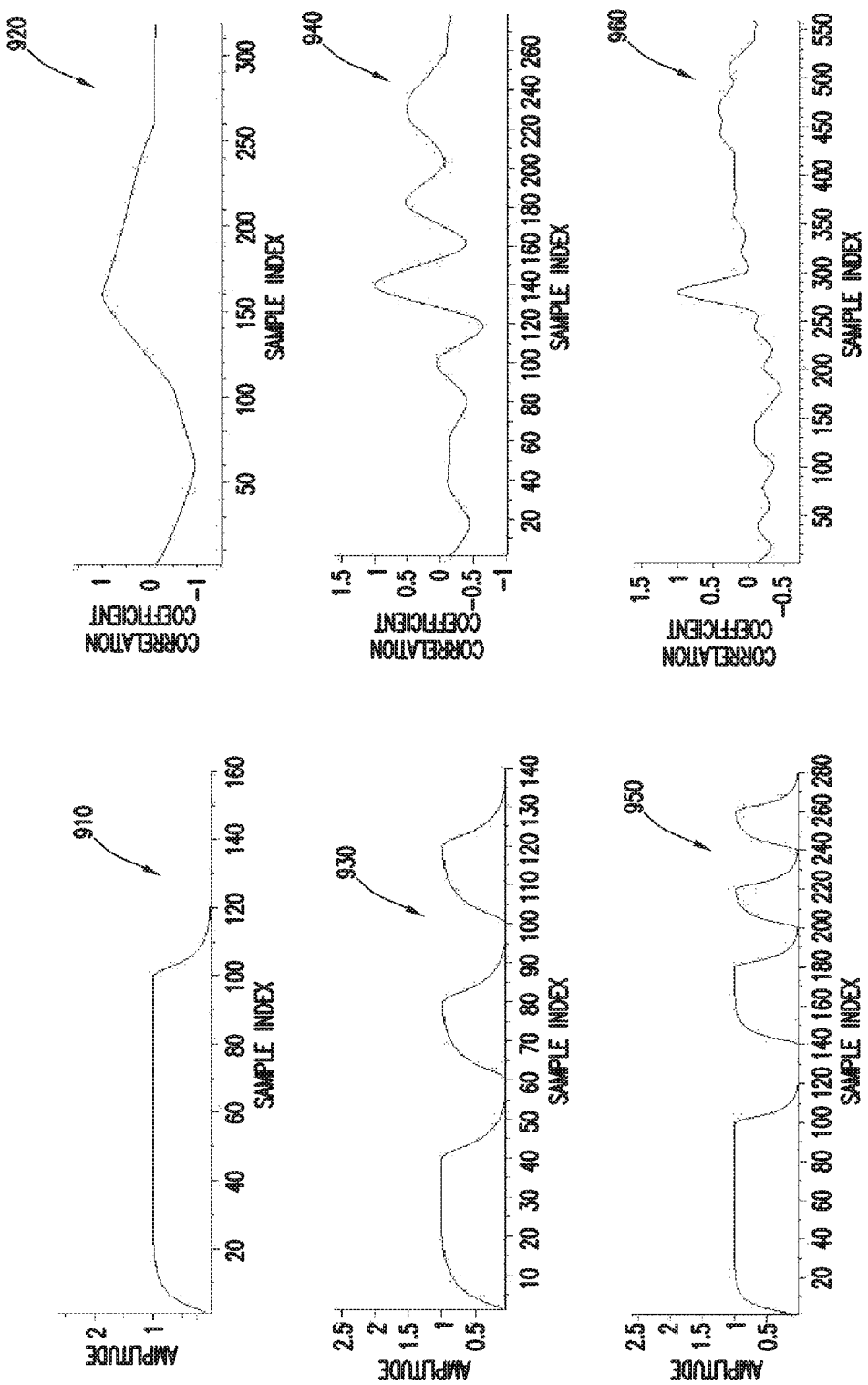
FIG. 9 is a graphical representation of the effect of combining an exemplary pair of signals on the autocorrelation consistent with embodiments of the present disclosure.
Figure 10:
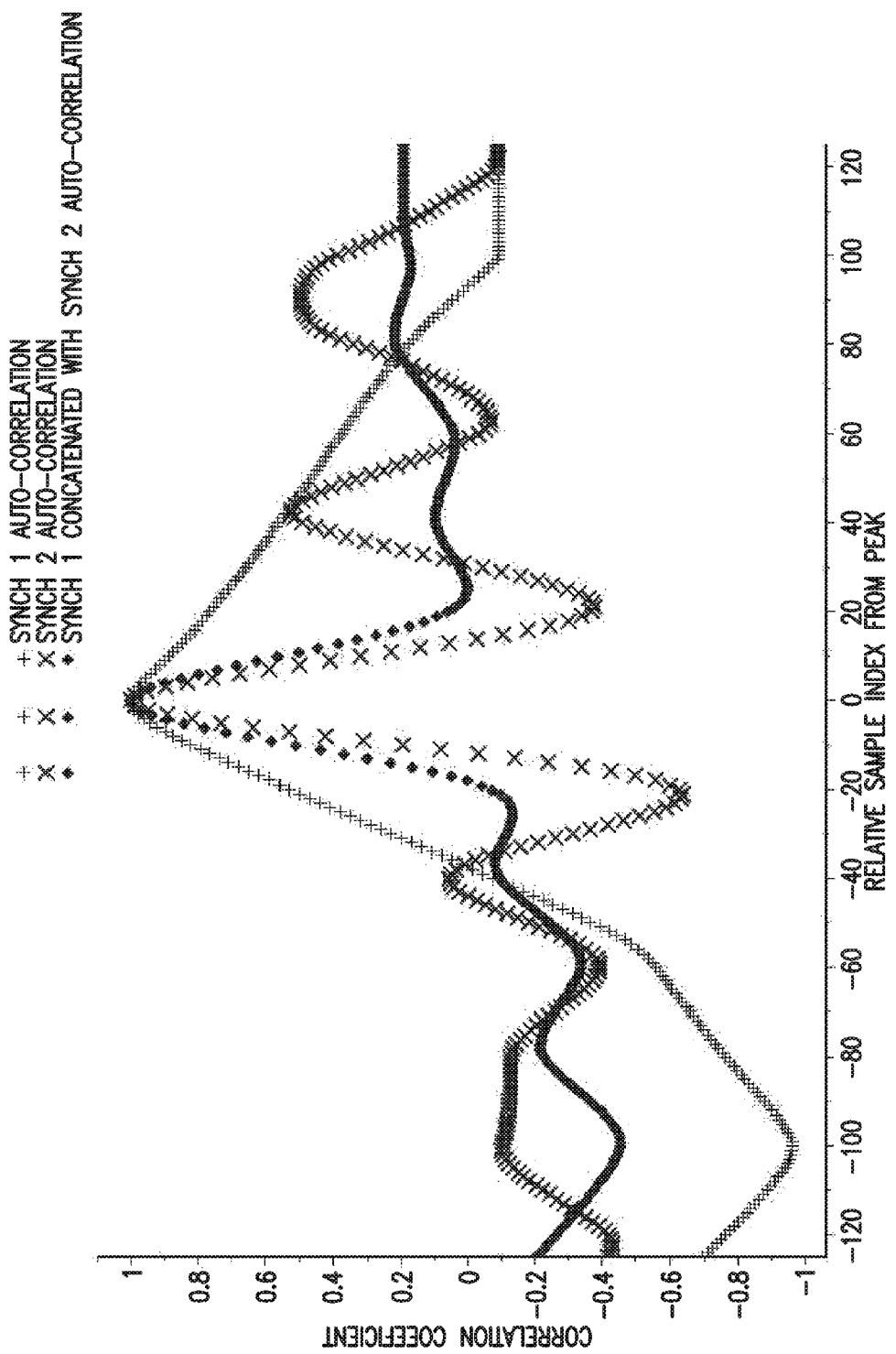
FIG. 10 is an expanded plot of autocorrelation graphs from FIG. 9 consistent with embodiments of the present disclosure.

In certain embodiments, a received signal may include, in addition to a main lobe for the synchronization sequence, one or more side lobes. The one or more side lobes may interfere with the detection of a synchronization sequence. The reduction in side lobe interference is depicted in FIGS. 9 and 10. FIG. 9 is a graphical representation of the autocorrelation of signals 1 and 2, as described above with reference to FIG. 4 compared to the effects of a combined correlation operation as described above with respect to FIG. 6. FIG. 9 depicts synchronization signal 1 in synch 1 graph 910 and the resulting auto-correlation of signal 1 in auto-correlation of synch 1 graph 920. FIG. 9 further depicts signal 2 in synch 2 graph 930 and the resulting auto-correlation of signal 2 in auto-correlation of synch 2 graph 940. The concatenation of signal 1 with signal 2 is shown in synch 1/synch 2 graph 950. The auto-correlation of signal 1 concatenated with signal 2 is shown in auto-correlation synch 1/synch 2 graph 960, which is the result of a combined correlation operation as described above with respect to FIG. 6. FIG. 10 is an expanded plot of overlain graphs 920, 940, and 960 from FIG. 9, showing the reduction in the side lobe peaks.

Alternate Channel Qualified Correlation—Another non-limiting example of a method to detect and accurately time synchronize to a combined synchronization sequence is to use an algorithm to qualify identification of a synchronization sequence on one channel with detection of the synchronization sequences on one or more additional channels. Separate correlators, as described above in reference to FIG. 4, may be operated on separate telemetry signals. When the output from any of the correlators exceeds a pre-defined threshold, correlator outputs from the other channels may be compared against a second pre-defined threshold to determine if signal lock has been achieved. The thresholds for each channel may be adjusted according to the estimated SNR for each channel. Comparison correlations for each channel may be calculated over a range of offsets centered about the estimated time delay with the offset range being adjusted according to an estimation of the error in the estimated time delay for each channel.

Stacked (weighted average) Sequence Correlator—Another non-limiting example of a method to detect and accurately time synchronize to a combined synchronization sequence is the use of a correlator, as described above with reference to FIG. 4, or a matched filter on stacked synchronization sequences from two or more channels by averaging of the time period normalized synchronization sequences from the two or more channels. Time period normalized synchronization sequences are synchronization sequences that have been synchronized based on estimated time separation and interpolated so that the number of samples in each is the same to account for differences in signal frequency and/or sample rate between channels. The time period normalized synchronization sequences may then be averaged on a point by point basis with either equal weighting or weighting based on the estimated SNR or probability of bit error (Pb) for each channel.

Weighted correlation—In the weighted correlation method, a weighted correlation or matched filter score based on the correlation or matched filter output from each of the channels with weights adjusted according to an estimated SNR or estimated probability of bit error (Pb) for each of the channels may be calculated for the combined correlation sequence. Weight adjustment methods may include known diversity combining methods such as, for example, selection diversity, maximal ratio combining, or other optimal combining methods as indicated in "Performance Analysis of Conventional Diversity Combining Schemes in Rayleigh Fading Channel", "Eigen Theory for Optimal Signal Combining: A Unified Approach", "Optimum Combining in Digital Mobile Radio with Cochannel Interference", "The Optimal Weights of A Maximum Ratio Combiner Using An Eigenfilter Approach," all of which are incorporated herein by reference.

The equation for a weighted correlator, which calculates the weighted correlation coefficient, $\rho_w$, at time index k for n references waveforms, $r_i$, with corresponding signals, $s_i$, both of length $m_i$, with means and $\overline{r_i}$, $\overline{s_i}$, respectively and signal time offsets $o_i$, weighted by weights $W_i$, is as follows:

$$\rho_w(k) = \sum_{i=1}^{n} \frac{W_i \sum_{j=1}^{m_i} (r_i(j) - \overline{r_i})(s_i(k + o_i + j) - \overline{s_i})}{\sqrt{\left[\sum_{j=1}^{m_i} (r_i(j) - \overline{r_i})^2\right]\left[\sum_{j=1}^{m_i} (s_i(k + o_i + j) - \overline{s_i})^2\right]}}$$

Signals $s_i$ may include signals from any of the physical or frequency channels. Furthermore, signals $s_i$ may include signals from the same channel at different time offsets. Reference waveforms, $r_i$ may include reference waveforms for any of the of the physical or frequency channels corresponding to the signals, $s_i$. Signal time offsets, $o_i$, may include any of the estimated time delays. Furthermore, time offsets, $o_i$, may be varied to account for error in estimated time delay as previously indicated. Weights, $W_i$, may be adjusted, as described above, according to the estimated SNR or Pb for the corresponding channel.

Figure 11:
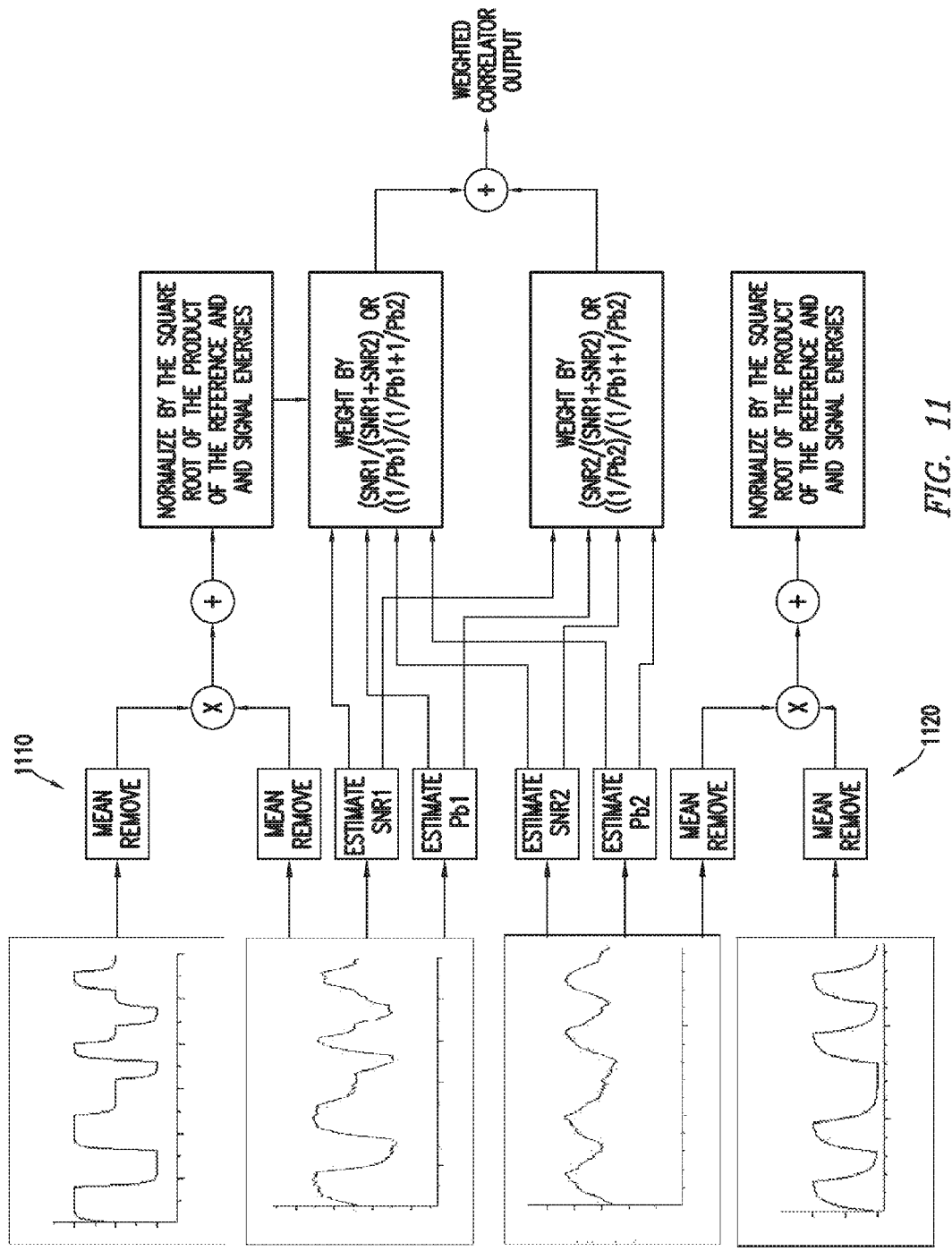
FIG. 11 is a graphical depiction of a weighted correlation operation consistent with embodiments of the present disclosure.

An example of a weighted correlation operation is depicted graphically in FIG. 11. As in FIG. 4, for each of incoming synchronization sequence/reference synchronization signal pairs 1110 (for signal 1) and 1120 (for signal 2), the sequence mean of both the incoming synchronization sequence and the reference synchronization sequence is removed. Each point of the incoming synchronization sequence and reference synchronization sequence is multiplied point by point, summed and then normalized by the square root of the product of the reference and signal energies to obtain unweighted correlation coefficient 1 and unweighted correlation coefficient 2. An estimate for the SNR and/or Pb for both signals 1 and 2 as received are obtained. Based on the SNR and/or Pb for both signals 1 and 2, the unweighted correlation coefficient 1 and unweighted correlation coefficient 2 are transformed into weighted correlation coefficient 1 and weighted correlation coefficient 2, respectively. Examples of the transformation algorithms are, for signal 1, (SNR1/(SNR1+SNR2) or ((1/Pb1)/(1/Pb1+1/Pb2). Examples of the transformation algorithms for signal 2 are (SNR2/(SNR1+SNR2) or ((1/Pb2)/(1/Pb1+1/Pb2). Weighted correlation coefficient 1 and weighted correlation coefficient 2 are then combined to form a weighted correlator output.

A combined synchronization sequence may be used to determine if signal lock has been achieved for a receiver by comparing the combined correlator output, stacked sequence correlator output, or weighted correlator output against a pre-defined correlation threshold. Use of the combined correlator output, stacked sequence correlator output, or weighted correlator results in an output of between −1 (−100%), which corresponds to completely uncorrelated to 1 (100%), which corresponds to completely correlated. The pre-defined correlation threshold may, for example, be between 50% and 100% or 55% and 85% or 65% and 75%. The predefined correlation threshold may be established, for example, by examining such factors as the synchronization sequence energy level, the noise level, the existence and value of side lobes. The pre-defined correlation threshold may differ for different channels as different channels may have different signal energy levels, noise energy levels, and lengths of synchronization sequences. A synchronization time is determined as the time of the peak correlator output for a small time period after the correlation threshold has been exceeded, i.e., the post-threshold time. Post-threshold time may be from, for instance, 0% to 100%, 1% to 50%, or from 5 to 25% of the synchronization sequence transmission time. In certain embodiments, signal lock is achieved when the pre-defined correlation threshold is exceeded and receiver is time synchronized to the peak correlation obtained by calculating the correlation coefficient for each successive sample of the signal along for 5% to 25% of the synchronization sequence time after exceeding the threshold.

Multiple synchronization sequences from a single channel—In certain embodiments, transmission of multiple synchronization sequences from a single channel may be used to improve synchronization, and, therefore obtain or improve signal lock, by using a known single channel synchronization timing between synchronization sequences. For example, two or more EM synchronization sequences at the same frequency may be transmitted at pre-defined intervals of between, for instance, 1 minutes and 3 minutes, or, as described below, where one channel transmits only synchronization sequences, the intervals between sequence signal transmissions may be zero minutes, i.e., back-to-back transmission. The surface controller may then search for the combined synchronization sequence that includes the two or more EM synchronization sequences at the same frequency separated a known single channel synchronization timing in addition to the synchronization sequences from other physical or frequency channels, such as MP synchronization sequences or EM synchronization sequences at different frequencies.

Signal lock on one channel—Where the surface receiver has achieved signal lock on one or more frequency or physical channels, the estimated time delay between receipt of synchronization sequences may be used to refine the surface receiver's synchronization sequence search or "search swath", i.e., reduce the time over which the surface receiver searches for the synchronization sequences for the non-signal locked channels based on the estimated time delay between the signal-locked and non-signal locked channels, improving the likelihood of obtaining a signal lock for non-signal locked channels. Further, or in the alternative, the correlation threshold for synchronization sequence detection may be reduced based on the estimated time delay. The reduction in correlation threshold may be a fixed amount over a fixed time period around the expected arrival time of synchronization signal of the non-signal locked or may be a function of the likelihood of arrival at a particular time so that the reduction in correlation threshold is at a maximum at the most likely time of arrival and zero when the likelihood of arrival is below a likelihood of arrival threshold (10% for example). If the estimated time separation is known with a high degree of confidence, i.e., the time error relative to the time of the synchronization sequence is less than 1%, the surface receiver may use the estimated time separation to time synchronize the previously non-signal locked channel without directly detecting the non-signal locked channel's synchronization sequence.

Event-assisted synchronization—Synchronization sequences may be initiated based on detection of an event such as, for example, the start or stop of drilling fluid flow, start or stop of drill-string rotation, movement of the drill-string up or down or contact of the drill bit with the bottom of the hole. Event detection may be accomplished by an event detection sensor or collection of event detection sensors connected to one or more analog to digital converters which may be connected to one or more processors in the downhole system or at the surface. For example, start/stop of drilling fluid flow could be detected up-hole with a pump stroke rate counter or stand-pipe pressure transducer or downhole with a pressure transducer, output voltage of a turbine driven generator or the vibration caused by fluid flow as sensed by a cross-axis accelerometer. Flow could be detected, then, when the processor reads a value from the sensor that exceeds a pre-defined threshold and the cessation of flow detected when the value drops below a pre-defined threshold that would normally be slightly lower than the flow threshold providing some hysteresis. Drill bit rotation could be detected by an optical or magnetic encoder attached to the top-drive up-hole or by a cross-axis accelerometer or magnetometer or an along hole axis aligned gyroscope in the down-hole system. Movement of the drill-string up/down could be detected up-hole via a draw-works encoder and down-hole via an along-hole aligned accelerometer. Contact with the bottom of the hole could be determined up-hole with a draw-works encoder or a weight indicator and downhole via an along hole-aligned accelerometer. In some embodiments, the event detection system or sensors may be separated from the receiver and communicatively coupled to it via a wired or wireless connection.

When synchronization sequences are initiated based on the detection of an event, the correlation threshold for synchronization sequence detection may be reduced near an expected arrival time at the receiver. The expected arrival time is the time from the event occurrence plus the estimated propagation delay time for the channel corrected by estimated clock drift. The expected arrival time may be further adjusted by the estimated difference between surface and downhole event detection times. The reduction in correlation threshold may be a fixed amount over a fixed time period around the expected arrival time or may be a function of the likelihood of arrival at a particular time so that the reduction in correlation threshold is at a maximum at the most likely time of arrival and zero when the likelihood of arrival is below a likelihood of arrival threshold (10% for example). As an example, the correlation threshold may be calculated as: $T(n)=T0-Pa(n)*0.1$; for $Pa(n)>=0.1$, $T(n)=T0$; for $Pa(n)<0.1$, where n is the time index, $T(n)$ is the calculated correlation threshold and $Pa(n)$ is the probability of arrival at time index n. $Pa(n)$ may be estimated based on the uncertainties in propagation time and difference between surface and down-hole detection times.

Synchronization-only channels—In certain embodiments, one or more channels can be used to transmit only synchronization sequences via synchronization only signals. All of the signal energy in these channels may be used to synchronize the telemetry, resulting in improved ability of the receiver to obtain signal lock. In some embodiments, one or more channels can be used to transmit data sequences only via data only signals, increasing the data rate due to elimination of time required to transmit synchronization sequences.

Noise and Signal Estimator

SNR for each of the frequency and/or physical channels may be predicted by estimating the noise level and signal level for a telemetry signal for that channel prior to transmission of the telemetry signal. In certain embodiments, estimating the expected signal level is accomplished by use of a channel frequency response model that predicts the frequency dependent effect that a channel has on signal amplitude. One embodiment of a channel frequency response model is described in US Publication No. 2014/0354444A1, which is incorporated herein by reference. Another embodiment of a channel frequency response model may be implemented by using an adaptive filter in system identification mode or by using a pre-determined transmission channel model which could be parametric and updated with rig-site measurements. An adaptive filter or adaptive linear combiner is known in the art ("Adaptive Signal Processing", Bernard Widrow, Samuel D. Stearns, Prentice Hall, Copyright 1985) and can be setup such that the input sequence for the filter is our reference and the desired sequence for the filter is our received signal. When setup in this manner, an adaptive filter may adjust its coefficients so that the resultant filter's impulse response matches the impulse response of the channel. Several adaptive algorithms exist for adapting the coefficients, including, for example and without limitation, the Least Mean Squared (LMS) and Recursive Least Squares (RLS).

Estimating the expected noise level can be accomplished by estimating the power spectral density (PSD) of the noise for each channel either during periods where no signal is transmitted or by subtracting the known signal from the received signal and estimating the PSD of the remaining noise signal. Spectral estimation techniques known in the art can be used to estimate the noise PSD, including but not limited to the periodogram averaging techniques of Welch, P. D. (1967) "The Use of Fast Fourier Transform for the Estimation of Power Spectra: A Method Based on Time Averaging Over Short, Modified Periodograms", *IEEE Transactions on Audio Electroacoustics*, AU-15, 70-73, Bartlett, M. S. (1948). "*Smoothing Periodograms from Time-Series with Continuous Spectra*". Nature 161: 686-687, or other FFT based methods.

As described above, the expected noise level may be used for prediction of the SNR for each of the frequency and/or physical channels. In other embodiments, a noise library may be used to predict the SNR for each of the frequency and/or physical channels. For the noise library, a library of noise PSDs for each channel may be indexed by drilling and rig activities. Examples of drill and rig activities include rotation rate and rotary torque, weight-on-bit, pumps being used and rate of each pump, formation being drilled, rate-of-penetration, draw-works speed, on/off state and speed of the various mixing motors on the rig, and BHA vibration level. In certain embodiments, the prediction of the SNR for each of the frequency and/or physical channels may be based on a combination of the expected noise level and the noise library.

In certain embodiments, the noise library is augmented by cataloging common progressions of noise with respect to time as well as rig activity. As an example, rig pumps are often ramped up to the rate used during drilling in the same time sequence. By cataloging the average PSD of pressure noise observed from the pumps over time, the predicted PSD of noise during pump ramp-up could be improved over use of the pressure PSD just prior to the next transmission period alone.

Determination of the expected signal level and expected noise level may include knowledge of when a tool is transmitting and when it is not so that the difference between signal and noise may be determined. Where one or more of the signals in a particular frequency or physical channel are not signal-locked, but one or more or a combination of the signals from the other channels are signal-locked, the estimated time difference between the telemetry signals can be used to determine timing of transmission in the channel and therefore distinguish noise from signal. Where no breaks in transmission occur in the unreliable channel, the time difference estimation in combination with foreknowledge of the transmission sequences can be used to identify when a synchronization sequence would be sent, which can then be subtracted out at the previously known signal amplitude to obtain an estimated noise level in the unreliable channel.

Using the noise library, the received SNR may be improved by timing transmission of synchronization sequences in one or more channels to avoid noise levels above a predetermined threshold. The time offset estimation between one or more reliable channels can be used to determine the current transmit timing of an unreliable channel making determination of need to change transmission sequence timing more reliable.

When the data sequences transmitted on one or more channels is identical, estimated SNR, or estimated $P_b$, may be used to weight a combination of the incoming data sequences from each of the channels or to optimally weight the determination of the most likely transmitted signal in a multi-input optimal decoder. A non-limiting example of a multi-input optimal decoder includes use of a bank of combined or weighted correlators as described above. A bank of correlators may include a correlator for each possible data signal. The data decoded corresponds to the correlator whose output is highest. Because the combined and weighted correlators may combine waveforms of different shape, amplitude and length into a single correlation value, the combined and weighted correlators may be used to decode data transmitted on two or more channels where the waveforms used differ.

Probability of Bit Error Estimator—As is known in the art of communications theory, the probability of bit error (Pb) can be calculated for a given coding technique if the SNR is known. Expected noise level and expected signal level predicted by the channel model can be used to estimate Pb.

Transmission optimizer—Pb may be improved, i.e., improving the likelihood of interpreting the bits of the telemetry signal correctly, by changing the frequency channel for a particular physical channel as predicted by the estimated Pb obtained from expected signal level and expected noise levels determined as described above. Forward error correction (FEC) methods, such as LDPC and turbo codes may be used to improve Pb. If predicted SNR falls below a certain predefined threshold, however, Pb may be degraded to where the telemetry signal is not reliable. Therefore, the expected noise level and expected signal level estimates described above may be used to determine if a prospective FEC technique is expected to improve Pb, in which case the surface transmitter may downlink to the uplink controller and send a command to switch to a different FEC method. In certain embodiments, the estimated Pb may be used to determine whether to apply a data compression technique, such as adaptive Huffman coding, where loss of any of the encoded bits will result in misinterpretation of subsequent bits. In yet other embodiments, combinations of changes to the encoding techniques, FEC and data compression may be considered with their respective estimated Pbs and data throughput with the best performing combinations selected by the surface controller and commanded to the uplink system. Non-limiting examples of encoding techniques include binary phase shift key (BPSK), quadrature phase shift key (QPSK), quadrature amplitude modulation (QAM), minimum shift key, M-ary phase shift key, M-ary frequency shift key, pulse position modulation, pulse width modulation, pulse code modulation, M-ary pulse code modulation, chirp modulation and combinations thereof. In other embodiments, predicted SNR or Pb are used to determine the energy level, length, and frequency of transmission of synchronization sequences required to maintain signal-lock.

High priority alert data may be transmitted on a combination of channels so as to maximize likelihood of reception and reduce delay in reception of the alert. In certain embodiments, high priority alert data may be transmitted on the combination of channels simultaneously. In other embodiments, high priority alert data may be transmitted on a particular channel if the time delay and Pb requirements are met. Delay and Pb requirements may differ depending on the degree of criticality of the alert. For example, a high vibration level detected downhole that is >65% but <75% of the maximum level allowable before tool damage is expected to occur might be sent on the MP channel alone if the Pb is <0.1% but sent on both the EM and MP channels if Pb is >3%. Downhole determination of high pressure indicative of a pressure kick, however, might be sent on all available channels without regard to predicted Pb.

When the predicted Pb for one of more channels is below a predetermined data reliability rate, the data sequence transmission rate on one or more channel may be increased by calculating the data transmission rate for each channel that would increase Pb to a pre-determined maximum allowable level, or, in another embodiment, by determining the raw transmission data rate that maximizes the data throughput ([1−Pb]*Data Rate) for the channel.

In some embodiments, such as when the estimated Pb for any channel is below a predetermined threshold, i.e., more reliable than required, transmit power for the associated channel may be reduced such as by reducing duty cycle or transmit power level or both to where Pb is estimated to be at the minimum required level. For channels for which no increase in transmit power, duty cycle or encoding method is predicted to result in an acceptable Pb, the transmitter may be turned off to conserve power.

Data sequences in each of the channels may be organized such that the most significant bits are sent in one channel, the next most-significant bits sent in another channel and so forth until all of the bits of the data have been encoded across two or more of the available channels. Channels with the lowest predicted Pb (most reliable) may be used to transmit the most significant bits with each set of less significant bits being transmitted on channels with successively higher Pb. This way, the course resolution data is most likely to be received reliably while the data representing finer and finer resolution is less likely to be received. Often times, a coarse representation of data is sufficient to continue drilling even though finer resolution may be desired.

Surveys, such as downhole gyroscopic, magnetic or other surveys, may be transmitted to surface as a priority to reduce delays in drilling. Since the MP telemetry signal may not be transmitted when mud pumps are down, the EM telemetry signal may be used to transmit the survey when a pumps down condition is detected. To save time, when the mud pumps are brought online and MP telemetry signal transmission begins, the survey may be omitted from the MP data sequence if the survey was received correctly via EM telemetry transmission. When Pb is estimated to be high (low reliability) on all channels on which the survey was transmitted such that incorrect decoding of the survey may be expected, the survey may be transmitted on two or more channels and received with the use of a weighted correlator or other optimal multi-input reception methods as described above. In certain physical channels, such as EM, the bandwidth of one physical channel may be higher than other channels, such as MP. In some embodiments, the survey may be transmitted on the high bandwidth channel multiple times with the multiple instances of the survey included as separate inputs into the multiple input decoder. If Pb is high (low reliability), the same repetition may be used in the lower bandwidth channel as well.

Noise Cancellation—MP pump noise cancellation may be accomplished by using multiple transducers spaced apart and spatial filtering or by using a sensor on the pump to detect pump rate and correlating pump rate to the pump noise in the signal.

EM noise cancellation may be accomplished using current sensors to pick up power signals going to motors on the rig as a noise reference or by placing additional ground electrodes separate from the signal electrodes for obtaining a noise reference, such as those described in U.S. Pat. Nos. 5,189,415 and 4,980,682, which are incorporated herein by reference.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
providing one or more telemetry transmission systems, the one or more transmission systems comprising one or more receivers and one or more transmitters;
providing a controller, the controller in data connection with each of the one or more telemetry transmission systems;
transmitting a first synchronization sequence from the one or more telemetry transmission systems, the first synchronization sequence transmitted in a first channel, the first synchronization sequence being at least a portion of a first telemetry signal;
transmitting a second synchronization sequence from the one or more telemetry transmission systems, the second synchronization sequence transmitted in a second channel, the second synchronization sequence being at least a portion of a second telemetry signal, the first and second synchronization sequences transmitted simultaneously or at a predetermined time difference;
receiving the first synchronization sequence at the one or more receivers; and
receiving the second synchronization sequence at the one or more receivers.

2. The method of claim 1, wherein the first synchronization sequence and the second synchronization sequence are transmitted via different physical channels.

3. The method of claim 2, wherein the physical channels are selected from the group consisting of mud fluid column, electromagnetic through formation/drill-string, acoustic waves through drill-string, or wired-pipe.

4. The method of claim 1, wherein the first synchronization sequence and the second synchronization sequence are transmitted via different frequency channels.

5. The method of claim 1, wherein each of the one or more telemetry transmission systems includes a time synchronizer.

6. The method of claim 5, wherein the time synchronizer is a single clock.

7. The method of claim 5, wherein the time synchronizer is two or more clocks.

8. The method of claim 7, wherein the two are more clocks are synchronized clocks.

9. The method of claim 7, wherein the two are more clocks are not synchronized clocks and clock drift is estimated.

10. The method of claim 1, wherein the controller includes a receiving system, the receiving system adapted to receive telemetry signals from the first channel and the second channel simultaneously.

11. The method of claim 1, wherein the controller includes a channel propagation model.

12. The method of claim 11, wherein the channel propagation model is a time delay tracking model, a physical propagation model, or a blended time delay model.

13. The method of claim 12, wherein the channel propagation model is a time delay tracking model and wherein the method further comprises:
determining the estimated start time of the first synchronization sequence;
determining the estimate start time of the second synchronization sequence;
calculating a first measured time delay between the first synchronization sequence and the second synchronization sequence as the difference between the estimated start time of the first synchronization sequence and the second synchronization sequence;
obtaining signal lock in either the first channel or the second channel;
calculating a second measured time delay after signal lock in either the first channel or the second channel; and
blending the first measured time delay and the second measured time delay to obtain an updated time delay estimate, wherein the updated time delay estimate is an estimated time delay.

14. The method of claim of 12, wherein the channel propagation model is a physical propagation model and wherein the method further comprises:
supplying a depth measurement device;
determining the distance from a first transmitter to a first receiver using the depth measurement device;
determining the speed of the telemetry signal; and
determining a predicted time delay by dividing the distance from the first transmitter to the first receiver by the speed of the telemetry signal, wherein the predicted time delay is an estimated time delay.

15. The method of claim 12, wherein the channel propagation model is a blended time delay model and wherein the method further comprises:
determining a predicted time delay;
determining an updated time delay estimate;
blending the predicted time delay and the updated time delay to obtain an estimated time delay.

16. The method of claim 11, further comprising the steps of:
determining an estimated time delay for the first synchronization sequence and the second synchronization sequence;
performing a combined synchronization operation from the first synchronization sequence and the second synchronization sequence using the estimated time delay to detect a combined synchronization sequence; and
time synchronizing at least one receiver to the combined synchronization sequence.

17. The method of claim 16, wherein the step of performing a combined synchronization operation comprises correlating against the combination of the first synchronization sequence and the second synchronization sequence using a combined correlator.

18. The method of claim 17, wherein the combined synchronization operation results in the calculation of a combined correlator coefficient, $\rho_c$, wherein $\rho_c$ is calculated using the equation:

$$\rho_c(k) = \frac{\sum_{i=1}^{n} \sum_{j=1}^{m_i} (r_i(j) - \overline{r_i})(s_i(k+o_i+j) - \overline{s_i})}{\sqrt{\rho c, \left[\sum_{i=1}^{n} \sum_{j=1}^{m_i} (r_i(j) - \overline{r_i})^2\right]\left[\sum_{i=1}^{n} \sum_{j=1}^{m_i} (s_i(k+o_i+j) - \overline{s_i})^2\right]}}$$

wherein $\rho_c$, is determined at time index k for n reference waveforms, $r_i$, with corresponding signals, $s_i$, both of length $m_i$, with means $\overline{r_i}$ and $\overline{s_i}$ respectively and signal time offsets, $o_i$, and wherein $s_i$ are the first telemetry signal and second telemetry signal, reference waveforms, $r_i$, are the reference waveforms for the corresponding to the signals, $s_i$ and signal time offsets, $o_i$, are the estimated time delays for the first synchronization sequence and the second synchronization sequence.

19. The method of claim 16, wherein the step of performing a combined synchronization operation comprises:
removing the sequence mean of the first synchronization sequence;
removing the sequence mean of a first reference synchronization sequence;
multiplying each point of the first synchronization sequence and the first reference synchronization sequence to obtain a first resultant output;
removing the sequence mean of the second synchronization sequence;
removing the sequence mean of a second reference synchronization sequence;
multiplying each point of the second synchronization sequence and the second reference synchronization sequence to obtain a second resultant output;
summing the first resultant output and second resultant output to form a summed output;
normalizing the summed output by the square root of a product of the combined reference and signal energies to form a combined correlator output.

20. The method of claim 16, wherein the step of performing a combined synchronization sequence operation comprises:
determining a signal to noise ratio for the first channel;
determining a signal to noise ratio for the second channel;
setting a first pre-defined threshold based on the signal to noise ratio for the first channel;
setting a second pre-defined threshold based on the signal to noise ratio for the second channel;
correlating the first synchronization signal;
correlating the second synchronization signal;
determining if the output from the step of correlating the first synchronization signal or the output from correlating the output of the second synchronization signal exceeds the first pre-defined threshold or the second predefined threshold, respectively; and
if either the output from the step of correlating the first synchronization signal or the output from correlating the output of the second synchronization signal exceeds the first pre-defined threshold or the second predefined threshold, determining if signal lock has been achieved.

21. The method of claim 16, wherein the step of performing a combined synchronization operation comprises use of a weighted correlation method.

22. The method of claim 21, wherein the weighted correlation method uses a weighted correlator coefficient, $\rho_c$, wherein $\rho_c$, is calculated using the equation:

$$\rho_w(k) = \sum_{i=1}^{n} \frac{W_i \sum_{j=1}^{m_i} (r_i(j) - \overline{r_i})(s_i(k+o_i+j) - \overline{s_i})}{\sqrt{\left[\sum_{j=1}^{m_i} (r_i(j) - \overline{r_i})^2\right]\left[\sum_{j=1}^{m_i} (s_i(k+o_i+j) - \overline{s_i})^2\right]}}$$

wherein $\rho_c$, is determined at time index k for n reference waveforms, $r_i$, with corresponding signals, $s_i$, both of length $m_i$, with means and $\overline{r_i}$ and $\overline{s_i}$ respectively and signal time offsets, $o_i$, and wherein $s_i$ are the first telemetry signal and second telemetry signal, reference waveforms, $r_i$, are the reference waveforms for the corresponding to the signals, $s_i$ and signal time offsets, $o_i$, are the estimated time delays for the first synchronization sequence and the second synchronization sequence, weights, $W_i$, are weighting factors based on the estimated signal to noise ration (SNR) or probability of bit error (Pb) for the corresponding channel.

23. The method of claim 22, wherein the weight, $W_i$, for the first telemetry signal and second telemetry signal is determined by:
measuring the SNR of the first telemetry signal (SNR1);
measuring the SNR of the second telemetry signal (SNR2);
calculating the weighting factor for the first telemetry signal, $W_1$, using the formula (SNR1/(SNR1+SNR2); and
calculating the weighting factor for the second telemetry signal, $W_2$, using the formula (SNR2/(SNR1+SNR2).

24. The method of claim 21, wherein the weight, $W_i$, for the first telemetry signal and second telemetry signal is determined by:
measuring the Pb of the first telemetry signal (Pb1);
measuring the Pb of the second telemetry signal (Pb2);
calculating the weighting factor for the first telemetry signal, $W_1$, using the formula ((1/Pb1)/(1/Pb1+1/Pb2); and
calculating the weighting factor for the second telemetry signal, $W_2$, using the formula ((1/Pb2)/(1/Pb1+1/Pb2).

25. The method of claim 21, wherein the step of performing a combined synchronization operation comprises:
determining SNR (SNR1) or Pb (Pb1) for the first telemetry signal;
determining SNR (SNR2) or Pb (Pb2) for the second telemetry signal;
removing the sequence mean of a first reference synchronization sequence;
multiplying each point of the first synchronization sequence and the first reference synchronization sequence to obtain a first resultant output;
summing and then normalizing the first resultant output by the square root of the product of the reference and signal energies to obtain unweighted correlation coefficient 1;
removing the sequence mean of the second synchronization sequence;
removing the sequence mean of a second reference synchronization sequence;
multiplying each point of the second synchronization sequence and the second reference synchronization sequence to obtain a second resultant output;
summing and then normalizing the second resultant output by the square root of the product of the reference and signal energies to obtain unweighted correlation coefficient 2;

transforming the unweighted correlation coefficient 1 into weighted correlation coefficient 1 using either the SNR or Pb for telemetry signal 1;
transforming the unweighted correlation coefficient 2 into weighted correlation coefficient 2 using either the SNR or Pb for telemetry signal 2; and
combining weighted correlation coefficient 1 and weighted correlation coefficient 2 a to form a weighted correlator output.

26. The method of claim 25, wherein the transformation of unweighted correlation coefficient 1 into weighted correlation coefficient 1 and unweighted correlation coefficient 2 into weighted correlation coefficient 2 is accomplished by:
multiplying unweighted correlation coefficient 1 by (SNR1/(SNR1+SNR2) or ((1/Pb1)/(1/Pb1+1/Pb2)); and
multiplying unweighted coefficient 2 by (SNR2/(SNR1+SNR2) or ((1/Pb2)/(1/Pb1+1/Pb2)).

27. The method of claim 16 further comprising:
determining if signal lock has been achieved for one or more receivers.

28. The method of claim 27, wherein the step of determining if signal lock has been achieved comprises:
obtaining a combined correlator output, stacked sequence correlator output, or weighted correlator output, the combined correlator output, stacked sequence correlator output, or weighted correlator output ranging from −100% to 100%;
determining a pre-defined correlation threshold; and
comparing the combined correlator output, stacked sequence correlator output, or weighted correlator output to the pre-defined correlation threshold.

29. The method of claim 28, wherein the pre-defined correlation threshold is between 55% and 85%.

30. The method of claim 29 further comprising:
calculating the correlation coefficient for each samples of the telemetry signal,
determining a peak combined correlator output, stacked sequence correlator output, or weighted correlator output; and
determining a time of the peak combined correlator output, stacked sequence correlator output, or weighted correlator output, the time of the peak combined correlator output, stacked sequence correlator output, or weighted correlator output defining a synchronization time.

31. The method of claim 29, further comprising:
obtaining signal lock on the first channel;
searching for the second synchronization sequence in the second telemetry channel based on the estimated time delay between the first synchronization sequence and the second synchronization sequence.

32. The method of claim 29 further comprising:
detecting an event; and
searching for the first synchronization sequence in the first telemetry channel or the second synchronization sequence in the second synchronization channel based on the detection of the event.

33. The method of claim 32, wherein the event is the start or stop of drilling fluid flow, start or stop of drill-string rotation, movement of the drill-string up or down or contact of the drill bit with the bottom of the hole.

34. The method of claim 1, wherein the first telemetry channel or the second telemetry channel includes no data sequence.

35. A method comprising:
providing one or more telemetry transmission systems, the one or more transmission systems comprising one or more receivers and one or more transmitters;
providing a controller, the controller in data connection with each of the one or more telemetry transmission systems;
transmitting a first synchronization sequence from the one or more telemetry transmission systems, the first synchronization sequence transmitted in a first channel, the first synchronization sequence being at least a portion of a first telemetry signal;
repeating the first synchronization sequence in the first channel at a pre-determined interval; and
receiving the first synchronization sequence at the one or more receivers.

36. A method comprising:
providing one or more telemetry transmission systems, the one or more transmission systems comprising one or more receivers and one or more transmitters;
transmitting a first synchronization sequence from the one or more telemetry transmission systems, the first synchronization sequence transmitted in a first physical channel, the first synchronization sequence being at least a portion of a first telemetry signal;
transmitting a second synchronization sequence from the one or more telemetry transmission systems, the second synchronization sequence transmitted in a second physical channel, the second physical channel being different from the first physical channel, the second synchronization sequence being at least a portion of a second telemetry signal, the first and second synchronization sequences transmitted simultaneously or at a predetermined time difference;
receiving the first synchronization sequence at the one or more receivers; and
receiving the second synchronization sequence at the one or more receivers;
wherein the first and second physical channels are selected from the group consisting of mud fluid column, electromagnetic through formation/drill-string, acoustic waves through drill-string, or wired-pipe.

37. The method of claim 36, wherein the first synchronization sequence and the second synchronization sequence are transmitted via different physical channels.

38. The method of claim 37, wherein the physical channels are selected from the group consisting of mud fluid column, electromagnetic through formation/drill-string, acoustic waves through drill-string, or wired-pipe.

39. The method of claim 36, wherein the first synchronization sequence and the second synchronization sequence are transmitted via different frequency channels.

40. The method of claim 36, wherein each of the one or more telemetry transmission systems includes a time synchronizer.

41. The method of claim 40, wherein the time synchronizer is a single clock.

42. The method of claim 41, wherein the time synchronizer is two or more clocks.

43. The method of claim 42, wherein the two are more clocks are synchronized clocks.

44. The method of claim 42, wherein the two are more clocks are not synchronized clocks and clock drift is estimated.

* * * * *

UNITED STATES PATENT AND TRADEMARK OFFICE
CERTIFICATE OF CORRECTION

PATENT NO. : 9,749,717 B2
APPLICATION NO. : 15/011532
DATED : August 29, 2017
INVENTOR(S) : White et al.

Page 1 of 1

It is certified that error appears in the above-identified patent and that said Letters Patent is hereby corrected as shown below:

In the Specification

The equation at Column 15, Line 1 should read:

$$\rho_c(k) = \frac{\sum_{i=1}^{n} \sum_{j=1}^{m_i} (r_i(j) - \bar{r}_i)(s_i(k + o_i + j) - \bar{s}_i)}{\sqrt{\left[\sum_{i=1}^{n} \sum_{j=1}^{m_i} (r_i(j) - \bar{r}_i)^2\right] \left[\sum_{i=1}^{n} \sum_{j=1}^{m_i} (s_i(k + o_i + j) - \bar{s}_i)^2\right]}}$$

The equation at Column 16, Line 60 should read:

$$\rho_w(k) = \sum_{i=1}^{n} \frac{W_i \sum_{j=1}^{m_i} (r_i(j) - \bar{r}_i)(s_i(k + o_i + j) - \bar{s}_i)}{\sqrt{\left[\sum_{j=1}^{m_i} (r_i(j) - \bar{r}_i)^2\right] \left[\sum_{j=1}^{m_i} (s_i(k + o_i + j) - \bar{s}_i)^2\right]}}$$

In the Claims

The equation of Claim 18 at Column 25, Line 1 should read:

$$\rho_c(k) = \frac{\sum_{i=1}^{n} \sum_{j=1}^{m_i} (r_i(j) - \bar{r}_i)(s_i(k + o_i + j) - \bar{s}_i)}{\sqrt{\left[\sum_{i=1}^{n} \sum_{j=1}^{m_i} (r_i(j) - \bar{r}_i)^2\right] \left[\sum_{i=1}^{n} \sum_{j=1}^{m_i} (s_i(k + o_i + j) - \bar{s}_i)^2\right]}}$$

The equation of Claim 22 at Column 26, Line 1 should read:

$$\rho_w(k) = \sum_{i=1}^{n} \frac{W_i \sum_{j=1}^{m_i} (r_i(j) - \bar{r}_i)(s_i(k + o_i + j) - \bar{s}_i)}{\sqrt{\left[\sum_{j=1}^{m_i} (r_i(j) - \bar{r}_i)^2\right] \left[\sum_{j=1}^{m_i} (s_i(k + o_i + j) - \bar{s}_i)^2\right]}}$$

Signed and Sealed this
Twenty-eighth Day of July, 2020

Andrei Iancu
*Director of the United States Patent and Trademark Office*